United States Patent
Drucker et al.

(10) Patent No.: US 12,425,183 B1
(45) Date of Patent: Sep. 23, 2025

(54) REDUCING HOMOMORPHIC ENCRYPTION ROTATIONS WHEN RESHAPING A CIPHERTEXT

(71) Applicant: International Business Machines Corporation, Armonk, NY (US)

(72) Inventors: Nir Drucker, Zichron Yaakov (IL); Gilad Ezov, Binyamina (IL)

(73) Assignee: International Business Machines Corporation, Armonk, NY (US)

(*) Notice: Subject to any disclaimer, the term of this patent is extended or adjusted under 35 U.S.C. 154(b) by 71 days.

(21) Appl. No.: 18/609,995

(22) Filed: Mar. 19, 2024

(51) Int. Cl.
  *H04L 29/06* (2006.01)
  *H04L 9/00* (2022.01)

(52) U.S. Cl.
  CPC .................................... *H04L 9/008* (2013.01)

(58) Field of Classification Search
  None
  See application file for complete search history.

(56) References Cited

U.S. PATENT DOCUMENTS

| | | | |
|---|---|---|---|
| 11,177,935 B2 | 11/2021 | Musuvathi et al. | |
| 11,477,007 B1 | 10/2022 | Soceanu et al. | |
| 11,502,820 B2 | 11/2022 | Ratha et al. | |
| 2023/0053311 A1 | 2/2023 | Aharoni et al. | |
| 2023/0188317 A1* | 6/2023 | Choi | H04L 9/3093 380/28 |
| 2024/0106803 A1* | 3/2024 | Race | H04L 67/131 |
| 2024/0121076 A1* | 4/2024 | Lee | H04L 9/008 |
| 2024/0214194 A1* | 6/2024 | Kapur | H04L 9/088 |
| 2024/0259180 A1* | 8/2024 | Joye | H04L 9/008 |
| 2024/0313945 A1* | 9/2024 | Choi | H04L 9/3093 |

OTHER PUBLICATIONS

Koo, Zahyun et al. Key Reduction in Multi-Key and Threshold Multi-Key Homomorphic Encryptions by Reusing Error. IEEE Access, vol. 1. https://ieeexplore.ieee.org/stamp/stamp.jsp?tp=&arnumber=10129910 (Year: 2023).*

Han, Kyoohyung et al. Improved Homomorphic Discrete Fourier Transforms and FHE Bootstrapping. IEEE Access, vol. 7. https://ieeexplore.ieee.org/stamp/stamp.jsp?tp=&arnumber=8701685 (Year: 2019).*

(Continued)

*Primary Examiner* — Jeremiah L Avery
(74) *Attorney, Agent, or Firm* — Yee & Associates, P.C.

(57) ABSTRACT

Reducing homomorphic encryption (HE) rotations is provided. Input of a source tensor of HE ciphertexts is received and a mapping of elements from the source tensor to a target tensor. For each ciphertext, a vector of required rotations is computed according to the mapping plus a list of unique rotations. A first and second list of rotations are generated which have a combined number of rotations less than the list of unique rotations. For each rotation in the first list a ciphertext vector is computed that holds selected elements cyclically rotated by that rotation. For each rotation in the second list a subset of elements is selected from the ciphertext which is summed with ciphertext vectors generated according to the first list. A rotated ciphertext is generated from this sum rotated by the rotation in the second list. Rotated ciphertexts are summed, and the target tensor is output.

20 Claims, 13 Drawing Sheets

(56) References Cited

OTHER PUBLICATIONS

Huang, Yun Fan et al. Design and Implementation of Big Data Analysis Algorithm in Ciphertext Domain Based on Homomorphic Encryption. 2021 3rd International Conference on Applied Machine Learning (ICAML). https://ieeexplore.ieee.org/stamp/stamp.jsp?tp=&arnumber=9711992 (Year: 2021).*

Aharoni et al., "Complex Encoded Tile Tensors: Accelerating Encrypted Analytics," IEEE Security and Privacy, Sep.-Oct. 2022, pp. 35-43, vol. 20, No. 5, IEEE, accessed on [date], https://ieeexplore.ieee.org/document/9805391.

Aharoni et al., "HeLayers: A Tile Tensors Framework for Large Neural Networks on Encrypted Data," Proceedings on Privacy Enhancing Technologies, pp. 1-18, accessed on Feb. 12. 2024, https://arxiv.org/abs/2011.01805.

Aharoni et al., "Poster : Secure SqueezeNet inference in 4 minutes," 43rd IEEE Symposium on Security and Privacy, 2 pages, accessed on Feb. 12, 2024, https://www.ieee-security.org/TC/SP2022/downloads/SP22-posters/sp22-posters-50.pdf.

Anonymous, "Hyphen: A Hybrid Packing Method and Optimizations for Homomorphic Encryption Based Neural Network," ICLR 2023, 19 pages, openreview.net, accessed Feb. 9, 2024, https://openreview.net/pdf?id=fyD8adDrXo.

Brakerski et al., "Fully Homomorphic Encryption without Bootstrapping," ACM Transactions on Computation Theory, Jul. 2014, pp. 1-26, vol. 6, Issue 3, accessed Feb. 13, 2024, https://doi.org/10.1145/2633600.

Brakerski, "Fully Homomorphic Encryption without Modulus Switching from Classical GapSVP," Advances in Cryptology—CRYPTO 2012, Lecture Notes in Computer Science, 2012, pp. 1-19, vol. 7417, Springer, Berlin, Germany, accessed on Feb. 13, 2024, https://eprint.iacr.org/2012/078.pdf.

Brutzkus et al., "Low latency privacy preserving inference," International Conference on Machine Learning, 2019, pp. 1-18, arxiv.org, accessed Feburary 14, 2024, https://arxiv.org/abs/1812.10659.

Buselli, "Secure AI workloades using full homomorphic encrypted data," IBM Developer Blog, 2021, 6 pages, ibm.com, accessed on Feb. 16, 2024, https://developer.ibm.com/blogs/secure-ai-workloads-using-fully-homomorphic-encrypted-data/.

Cheon et al., "Faster Linear Transformations in HElib, Revisited," IEEE Access, Apr. 15, 2019, pp. 50595-50604, vol. 7, IEEE, accessed Feb. 16, 2024, https://ieeexplore.ieee.org/stamp/stamp.jsp?arnumber=8691744.

Cheon et al., "Homomorphic Encryption for Arithmetic of Approximate Numbers," Proceedings of Advances in Cryptology, Nov. 30, 2017, pp. 1-23, Springer, accessed Feb. 14, 2024, https://link.springer.com/chapter/10.1007/978-3-319-70694-8_15.

Crockett, "A low-depth homomorphic circuit for logistic regression model training," Workshop on Applied Homomorphic Cryptography 2020, 2020, Cryptology ePrint Archive, accessed Feb. 14, 2024, https://eprint.iacr.org/2020/1483.

Dathathri et al., "CHET: an optimizing compiler for fully-homomorphic neural-network inferencing," In Proceedings of the 40th ACM SIGPLAN Conference on Programming Language Design and Implementation (PLDI 2019), 2019, pp. 142-156, Association for Computing Machinery, New York, New York, United States, accessed Feb. 16, 2024, https://dl.acm.org/doi/10.1145/3314221.3314628.

Fan et al., "Somewhat Practical Fully Homomorphic Encryption," Proceedings of the 15th international conference on Practice and Theory in Public Key Cryptography , 2012, pp. 1-16, accessed Feb. 16, 2024, https://eprint.iacr. org/2012/144.

Gentry, et al., "Fully Homomorphic Encryption with Polylog Overhead," Advances in Cryptology—EUROCRYPT 22012: Lecture Notes in Computer Science, 18 pages, vol. 7237, Springer, Berlin, Heidelberg, accessed Feb. 9, 2024, https://link.springer.com/chapter/10.1007/978-3-642-29011-4_28.

Halevi et al., "Faster Homomorphic Linear Transformations in HElib," 2018 pp. 93-120, In: Shacham, H., Boldyreva, A. (eds) Advances in Cryptology—CRYPTO 2018. CRYPTO 2018. Lecture Notes in Computer Science(), vol. 10991, Springer, Cham, accessed on Feb. 16, 2024, https://doi.org/10.1007/978-3-319-96884-1_4.

Jiang et al., "Secure Outsourced Matrix Computation and Application to Neural Networks," In Proceedings of the 2018 ACM SIGSAC Conference on Computer and Communications Security (CCS '18), 2018, pp. 1-23, Association for Computing Machinery, New York, New York, United States, accessed Feb. 16, 2024, https://doi.org/10.1145/3243734.3243837.

Juvekar et al., "{Gazelle}: A low latency framework for secure neural network inference," 27th USENIX Security Symposium (USENIX Security 18), 2018, pp. 1651-1668, usenix.org, accessed Feb. 16, 2024, https://www.usenix.org/system/files/conference/usenixsecurity18/sec18-juvekar.pdf.

Mihara, et al., "Neural Network Training with Homomorphic Encryption," Dec. 29, 2020, 13 pages, arXiv.org, accessed Feb. 9, 2024, https://arxiv.org/pdf/2012.13552.pdf.

Xuanyuan, et al., "Efficient Privacy-Preserving Inference for Convolutional Neural Networks," ICLR2022 PAIR(2) Struct Workshop, Aug. 26, 2022, arXiv.org, accessed Feb. 9, 2024, https://arxiv.org/pdf/2110.08321.pdf.

* cited by examiner

| | | | | | | | | | | | | | | | | |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | ← 606 |
| 0 | 1 | 0 | 0 | 0 | 0 | 1 | 0 | 0 | 0 | 0 | 1 | 0 | 0 | 0 | 0 | ← 702 (X) |
| 0 | 2 | 0 | 0 | 0 | 0 | 7 | 0 | 0 | 0 | 0 | 12 | 0 | 0 | 0 | 0 | ← 704 |

FIG. 7

REDUCING HOMOMORPHIC ENCRYPTION ROTATIONS WHEN RESHAPING A CIPHERTEXT

BACKGROUND

The disclosure relates generally to homomorphic encryption and more specifically to repacking of encrypted data.

Homomorphic encryption (HE) is a form of encryption in which computations can be performed on encrypted data without the need to first decrypt the data. The encrypted data is in the form of a ciphertext that contains the original plaintext data in a form that is unreadable by a human or computer with the proper decryption key to decrypt it. The computations in homomorphic encryption are performed directly on the encrypted data (ciphertext(s)), which results in encrypted results that match the results of the same computations performed on the original unencrypted plaintext data (with possibly some error due to cryptographic error). Fully Homomorphic encryption (FHE) allows for arbitrary computations on encrypted data, supporting operations such as addition, subtraction, and multiplication operations without limitations on the depth or complexity of the computations.

HE allows users to evaluate any circuit (function) on encrypted data with the following four methods: Gen (generation), Enc (encryption), Dec (decryption), and Eval (evaluation). The client system uses Gen to generate a secret key, a public key, and evaluation keys. The client system stores the secret key and publishes the public key and evaluation keys. Subsequently, an untrusted entity can execute a function with the public key and evaluation keys to evaluate a function on a ciphertext and store the results in another ciphertext. The client then uses Dec to decrypt the results ciphertext.

HE enables computations to be outsourced to untrusted parties while still preserving privacy and confidentiality of the underlying data. Such outsourced computations might include machine learning, secure database queries, and privet set intersection algorithms.

Some homomorphic encryption schemes operate on ciphertexts in a single-instruction multiple data (SIMD) fashion wherein a single ciphertext encrypts a fixed-sized vector, and the homomorphic operations on the ciphertext are translated mathematically to operations on the elements in the slots of the plaintext vector. To utilize SIMD, more than one input element needs to be packed and encrypted in every ciphertext. The packing method can affect the latency (time to perform computation) and throughput (number of computations per unit of time), communication costs, and memory requirements.

Many HE circuits use reshaping/repacking operations such as matrix transpose and column switching, which involved rotations of elements to different slot positions in ciphertext vectors. Rotations are expensive operations that contribute to the cost of reshaping/repacking. Reducing the number of rotations can reduce the overall cost of performing reshaping/repacking, even at the additional cost of extra multiplication and multiplication depth.

SUMMARY

According to an illustrative embodiment, reducing homomorphic encryption (HE) rotations is provided. The method comprises receiving input of a source tensor of HE ciphertexts and a mapping of source elements from the source tensor to a target tensor of HE ciphertexts. For each source HE ciphertext, a rotation vector is computed of required rotations to transform on the source tensor to the target tensor according to the mapping as well as a list of unique rotations within each rotation vector. For each rotation vector, a first and second list of rotations are generated from the list of unique rotations. The rotations in the first list are applied before the rotations in the second list. The combined number of rotations in the first and second list is less than the list of unique rotations of the rotation vector. For each rotation in the first list the source HE ciphertext is multiplied by a first mask that selects a subset of source elements according to the mapping to generate a first masked vector. A source ciphertext vector is then computed that holds the selected source elements of the first masked vector cyclically rotated by a number of slots specified by the rotation in the first list. For each rotation in the second list the source HE ciphertext is multiplied by a second mask that selects a subset of source elements according to the mapping to generate a second masked vector, and the second masked vector is summed with any source ciphertext vector generated according to the first list requiring the same rotation in the second list. A rotated HE ciphertext is generated that holds the selected source elements of the second masked vector and source ciphertext vector rotated by a number of slots specified by the unique rotation in the second list. The rotated HE ciphertexts generated according to the first and second lists are summed and the target tensor of HE ciphertexts is output. According to other illustrative embodiments, a computer system and a computer program product for reducing homomorphic encryption rotations are provided.

BRIEF DESCRIPTION OF THE DRAWINGS

FIG. 7 depicts a diagram illustrating application of a ciphertext mask with which the illustrative embodiments can be implemented;

DETAILED DESCRIPTION

Figure 1:
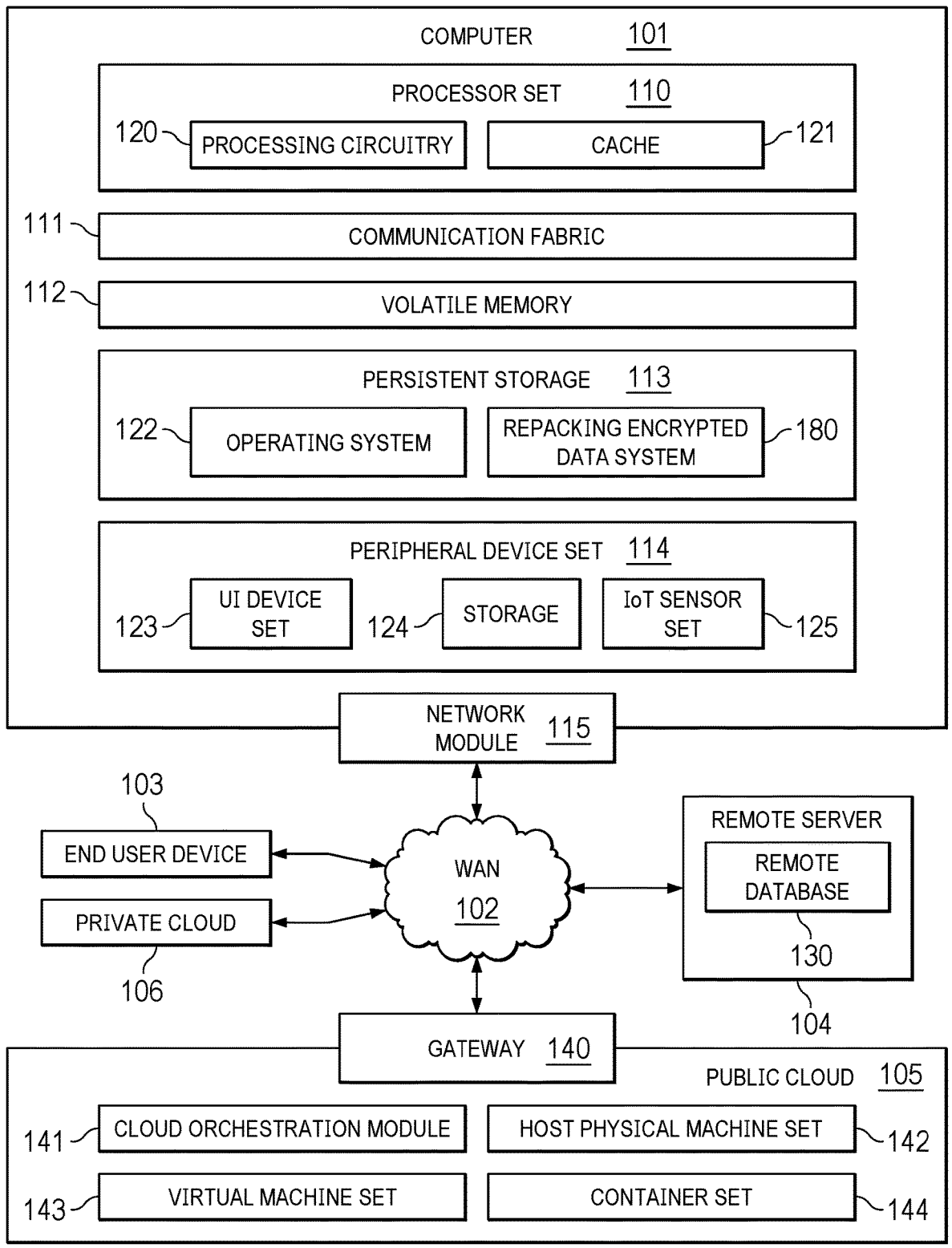
FIG. 1 is a block diagram of a computing environment in accordance with an illustrative embodiment.

According to an illustrative embodiment, reducing homomorphic encryption (HE) rotations is provided. The method comprises receiving input of a source tensor of HE ciphertexts and a mapping of source elements from the source tensor to a target tensor of HE ciphertexts. For each source HE ciphertext, a rotation vector is computed of required rotations to transform on the source tensor to the target tensor according to the mapping as well as a list of unique rotations within each rotation vector. For each rotation vector, a first and second list of rotations are generated from the list of unique rotations. The rotations in the first list are applied before the rotations in the second list. The combined number of rotations in the first and second list is less than the list of unique rotations of the rotation vector. For each rotation in the first list the source HE ciphertext is multiplied by a first mask that selects a subset of source elements according to the mapping to generate a first masked vector. A source ciphertext vector is then computed that holds the selected source elements of the first masked vector cyclically rotated by a number of slots specified by the rotation in the first list. For each rotation in the second list the source HE ciphertext is multiplied by a second mask that selects a subset of source elements according to the mapping to generate a second masked vector, and the second masked vector is summed with any source ciphertext vector generated according to the first list requiring the same rotation in the second list. A rotated HE ciphertext is generated that holds the selected source elements of the second masked vector and source ciphertext vector rotated by a number of slots specified by the unique rotation in the second list. The rotated HE ciphertexts generated according to the first and second lists are summed and the target tensor of HE ciphertexts is output. As a result, the illustrative embodiments provide the technical effect of enabling a reduction in the number of rotations needed to reshape a tensor of HE ciphertexts.

In the illustrative embodiments, the steps above can be recursively applied, wherein the second list of rotations is substituted for the list of unique rotations. Therefore, the illustrative embodiments provide the technical effect of iteratively reducing the number of required rotations to generate the target tensor from the source tensor.

As part of recursively applying the steps of the reducing required rotations the recursion ends upon one of reaching a specified maximum multiplication depth, a latency value of adding another iteration decreases below zero, or when the list of unique rotations can no longer be split into two lists. Therefore, the illustrative embodiments provide the technical effect of ending the recursion when it ceases to provide a computational improvement over a previous iteration.

As part of applying the first mask and second mask the first mask is approximately 1 in slot positions corresponding to source elements to be selected from the HE ciphertext for the rotation in the first list and approximately 0 for all other source elements in the HE ciphertext. The second mask is approximately 1 in slots positions corresponding to source elements to be selected from the HE ciphertext for the rotation in the second list and approximately 0 for all other source elements in the HE ciphertext. Therefore, the illustrative embodiments provide the technical effect of selecting source elements to which a specific unique rotation applies.

As part of generating a first list and second list of rotations from the list of unique rotations a number of rotation index values are selected to apply to a ciphertext that modify the list of unique rotations for that ciphertext. The rotation index values are applied to a number of unique rotations that can be merged with target rotations in the list of unique rotations. Dictionary of key values are generated for the unique rotations in the rotation vector, and respective first key values are assigned to the unique rotations to which the rotation index values are applied. A second key value is assigned to the target rotations, wherein the second key value indicates the target rotations are left unaltered. A third key value to is assigned unique rotations in the rotation vector, wherein the third key value indicates that application of the rotation index value produces no net reduction in the number of rotations. Therefore, the illustrative embodiments provide the technical effect of keeping track of changes applied to the list of unique rotations when generating the first and second list.

As part of applying the key values the rotation index values comprise the first list of rotations, and the rotations assigned the second key value and third key value comprise the second list of rotations. Therefore, the illustrative embodiments provide the technical effect of determining the first and second list of rotations according to dictionary key values.

As part of generating a first list and second list of rotations from the list of unique rotations selecting the rotation index value comprises generating a number of forest representations of rotations in the list of unique rotations. For each forest representation, a number of rotations are selected to remove. For each group of rotations removed from each forest representation, a score is determined, and the rotation for each forest representation that minimizes the score is found. Therefore, the illustrative embodiments provide the technical effect of avoiding the need for brute force calculations to select the rotation index value.

As part of removing the rotations from each forest representation the number of rotations selected for removal are removed one at the time. Alternatively, the number of rotations selected for removal are removed all at once. Therefore, the illustrative embodiments provide the technical effect of providing different methods of evaluating the forest representations.

As part of scoring the rotations removing from the forest the score is determined by at least one of number of rotations, forest depth, level of parallelization, memory utilization, power consumption, or minimizing the required number of rotation keys. Therefore, the illustrative embodiments provide the technical effect of providing alternate methods of scoring the effects of removing particular rotations.

A computer system comprises a storage device that stores program instructions and one or more processors operably connected to the storage device and configured to execute the program instructions to cause the system to receive input of a source tensor of HE ciphertexts and a mapping of source elements from the source tensor to a target tensor of HE ciphertexts; for each source HE ciphertext, compute a rotation vector of required rotations to transform on the source tensor to the target tensor according to the mapping; compute a list of unique rotations within each rotation vector; for each rotation vector, generate a first list and second list of rotations from the list of unique rotations, wherein the rotations in the first list are applied before the rotations in the second list, and wherein the combined number of rotations in the first and second list is less than the list of unique rotations of the rotation vector; for each rotation in the first list: multiply the source HE ciphertext by a first mask that selects a subset of source elements according to the mapping to generate a first masked vector and compute a source ciphertext vector that holds the selected source elements of the first masked vector cyclically rotated by a number of slots specified by the rotation in the first list; for each rotation in the second list: multiply the source HE ciphertext by a second mask that selects a subset of source elements according to the mapping to generate a second masked vector, sum the second masked vector and any source ciphertext vector generated according to the first list requiring the same rotation in the second list, and compute a rotated HE ciphertext that holds the selected source elements of the second masked vector and source ciphertext vector rotated by a number of slots specified by the unique rotation in the second list; sum the rotated HE ciphertexts generated according to the first and second lists; and output the target tensor of HE ciphertexts.

As part of recursively applying the steps of the reducing required rotations the recursion ends upon one of reaching a specified maximum multiplication depth, a latency value of adding another iteration decreases below zero, or when the list of unique rotations can no longer be split into two lists. Therefore, the illustrative embodiments provide the technical effect of ending the recursion when it ceases to provide a computational improvement over a previous iteration.

As part of generating a first list and second list of rotations from the list of unique rotations a number of rotation index values are selected to apply to a ciphertext that modify the list of unique rotations for that ciphertext. The rotation index values are applied to a number of unique rotations that can be merged with target rotations in the list of unique rotations. Dictionary of key values are generated for the unique rotations in the rotation vector, and respective first key values are assigned to the unique rotations to which the rotation index values are applied. A second key value is assigned to the target rotations, wherein the second key value indicates the target rotations are left unaltered. A third key value to is assigned unique rotations in the rotation vector, wherein the third key value indicates that application of the rotation index value produces no net reduction in the number of rotations. Therefore, the illustrative embodiments provide the technical effect of keeping track of changes applied to the list of unique rotations when generating the first and second list.

As part of applying the key values the rotation index values comprise the first list of rotations, and the rotations assigned the second key value and third key value comprise the second list of rotations. Therefore, the illustrative embodiments provide the technical effect of determining the first and second list of rotations according to dictionary key values.

As part of generating a first list and second list of rotations from the list of unique rotations selecting the rotation index value comprises generating a number of forest representations of rotations in the list of unique rotations. For each forest representation, a number of rotations are selected to remove. For each group of rotations removed from each forest representation, a score is determined, and the rotation for each forest representation that minimizes the score is found. Therefore, the illustrative embodiments provide the technical effect of avoiding the need for brute force calculations to select the rotation index value.

As part of removing the rotations from each forest representation the number of rotations selected for removal are removed one at the time. Alternatively, the number of rotations selected for removal are removed all at once. Therefore, the illustrative embodiments provide the technical effect of providing different methods of evaluating the forest representations.

As part of scoring the rotations removing from the forest the score is determined by at least one of number of rotations, forest depth, level of parallelization, memory utilization, power consumption, or minimizing the required number of rotation keys. Therefore, the illustrative embodiments provide the technical effect of providing alternate methods of scoring the effects of removing particular rotations.

A computer program product for reducing homomorphic encryption (HE) rotations. A persistent storage medium has program instructions configured to cause one or more processors to receive input of a source tensor of HE ciphertexts and a mapping of source elements from the source tensor to a target tensor of HE ciphertexts; for each source HE ciphertext, compute a rotation vector of required rotations to transform on the source tensor to the target tensor according to the mapping; compute a list of unique rotations within each rotation vector; for each rotation vector, generate a first list and second list of rotations from the list of unique rotations, wherein the rotations in the first list are applied before the rotations in the second list, and wherein the combined number of rotations in the first and second list is less than the list of unique rotations of the rotation vector; for each rotation in the first list: multiply the source HE ciphertext by a first mask that selects a subset of source elements according to the mapping to generate a first masked vector and compute a source ciphertext vector that holds the selected source elements of the first masked vector cyclically rotated by a number of slots specified by the rotation in the first list; for each rotation in the second list: multiply the source HE ciphertext by a second mask that selects a subset of source elements according to the mapping to generate a second masked vector, sum the second masked vector and any source ciphertext vector generated according to the first list requiring the same rotation in the second list, and compute a rotated HE ciphertext that holds the selected source elements of the second masked vector and source ciphertext vector rotated by a number of slots specified by the unique rotation in the second list; sum the rotated HE ciphertexts generated according to the first and second lists; and output the target tensor of HE ciphertexts.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2A:
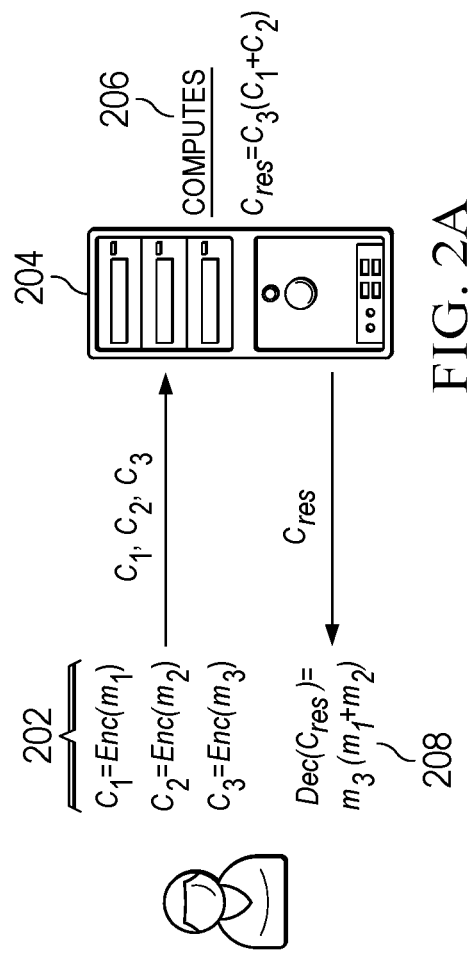
FIG. 2A depicts a diagram illustrating an example of arithmetic computation under homomorphic encryption to which the illustrative embodiments can be applied.
Figure 2B:
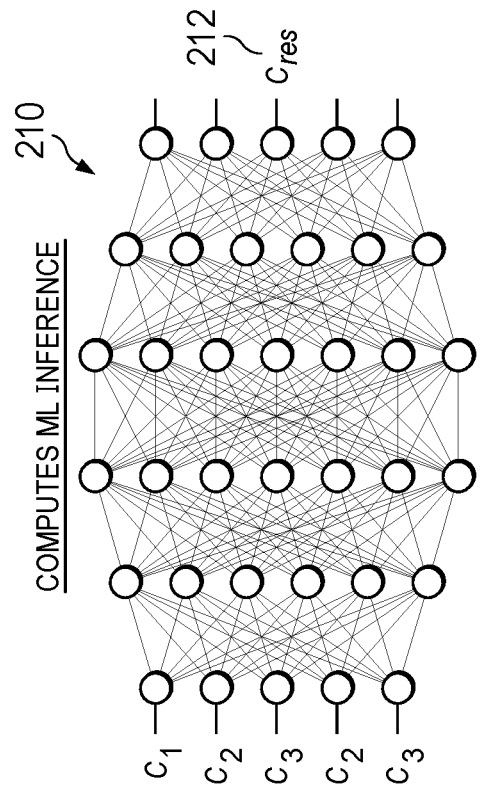
FIG. 2B depicts a diagram illustrating an example of machine learning under homomorphic encryption to which the illustrative embodiments can be applied.
Figure 2B:
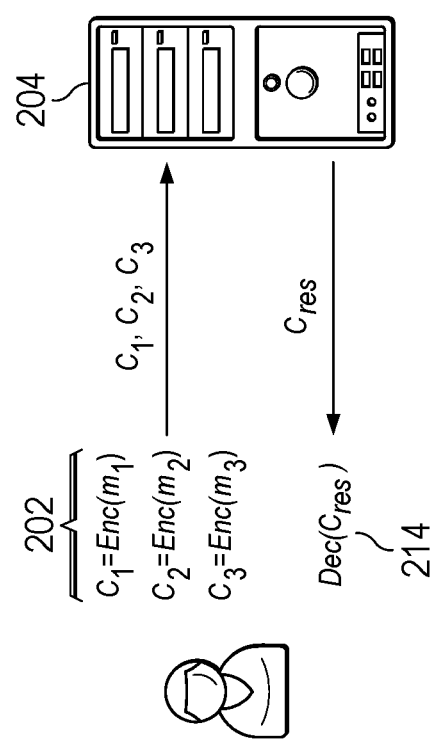

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as repacking encrypted data system 180.

In addition to repacking encrypted data system 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and repacking encrypted data system 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in repacking encrypted data system 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in repacking encrypted data system 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account a number of different considerations as described herein. For example, the illustrative embodiments recognize and take into account that a tile tensor (array) is a data structure that makes ciphertext packing easier. For example, packing a matrix using tile tensors can be done using 2D or 3D tensors depending on the context. When the goal is to multiply the matrix by a vector, 2D objects are typically used for the matrix and vector. When the goal is to multiply the matrix by another matrix, typically 3D objects are used for both matrices.

The illustrative embodiments also recognize and take into account that in many cases there is a need to reshape (permute) the content within a tile tensor, e.g., perform a transpose or modify the tile tensor shape. This process usually involves, for every tile, using a mask to group together all elements that should use the same rotation index (see FIG. 4). The associated rotation is applied to each group of masked elements, and then all masked elements are added to generate the desired result. Such repacking under encryption can be a costly operation that involves either many rotations or a high multiplication depth.

The illustrative embodiments provide a method of reducing the number of rotations to reshape a tile tensor. The method trades a number n of rotations for a smaller number m<n of rotations, wherein multiplication depth increases only by a fixed (predetermined) size (e.g., an increase by 1). The algorithm receives a Source and a Target as input. The Source and Target comprise multidimensional arrays of ciphertexts, which might be called tile tensors. Elements of the Source are placed in different locations (slots and/or ciphertexts) in the Target. It should be noted that not all of the elements in the Source must appear in the Target. The operation to go from the Source array to the Target array is called a transformation. The method of the illustrative embodiments takes a given transformation p1 and splits it into two transformations with a smaller number of rotations, p2*p3=p1. This process can be repeated on the latest transformation (i.e., p2 and p3) in a recursive way, wherein every level increases the multiplication depth by 1.

FIG. 2A depicts a diagram illustrating an example of arithmetic computation under homomorphic encryption to which the illustrative embodiments can be applied. FIG. 2B depicts a diagram illustrating an example of machine learning under homomorphic encryption to which the illustrative embodiments can be applied.

In both examples, a user encrypts data $m_1$, $m_2$, $m_3$ into ciphertexts $C_1$, $C_2$, $C_3$ 202 and then sends the ciphertexts 202 to an untrusted third party such as a cloud system 204 for computation. The examples differ with regard to the nature of the computation performed by the cloud system 204. In FIG. 2A, cloud system 204 performs an arithmetic operation with the encrypted ciphertexts 202 to generate an encrypted result $C_{res}$ 206, which is returned to the user. The user can then decrypt the encrypted result 206 to obtain decrypted results $Dec(C_{res})$ 208 which is equivalent to the result that would have been obtained by performing the same arithmetic operation on the original unencrypted data $m_1$, $m_2$, $m_3$.

The example shown in FIG. 2B is a concrete example of computation performed on the ciphertexts $C_1$, $C_2$, $C_3$ 202. In this example, the ciphertexts 202 are fed into the input layer of an artificial neural network 210, which generates a machine learning inference in the form of encrypted result 212 that is returned to the user for decryption to obtain decrypted result $Dec(C_{res})$ 214. Again, the encrypted result 212 generated by neural network 210 is the same as a machine learning inference generated from the original unencrypted data $m_1$, $m_2$, $m_3$.

In the context of homomorphic encryption, ciphertext packing refers to how plaintext data is packed within one or more ciphertexts. This packing can involve simple major-row packing or more complex packing such as a tile tensor (see below). After packing, ciphertexts can be processed to evaluate a function on them. The packing method of choice defines how fast this processing can be performed. As a simple example, assume a plaintext vector x=(1,2,3,4,5,6,7, 8) and a function $f(x)=x^2$ to be computed elementwise on x. If x is packed into one ciphertext C that encrypts the 8 elements in parallel, then to evaluate f only one multiplication is needed, results=C*C. In contrast, if all 8 elements of x are packed in separate ciphertexts, C1-C8, then the multiplications required increase with the number of ciphertexts, results=C1*C1, C2*C2, . . . , C8*C8. Therefore, different packing choices affect the computational metrics such as latency, required memory, bandwidth, etc.

Single Instruction Multiple Data (SIMD) is a type of parallel computing architecture that performs the same operation on multiple data points simultaneously. In SIMD, a single instruction is executed on multiple data elements in parallel. In HE, SIMD can be used as a ciphertext packing approach in which multiple values are packed into one ciphertext. The arithmetic operations of HE (addition, subtraction, multiplication) operate in SIMD fashion, i.e., elementwise on the corresponding ciphertexts. Therefore, multiplying two ciphertexts (C1*C2) involves multiplying all the encrypted elements in C1 and C2 at once.

A ciphertext of the CKKS (Cheon-Kim-Kim-Song) fully homomorphic encryption (FHE) scheme (as in other popular FHE schemes) encrypts a vector of real values, wherein the entries of the vectors are termed "slots." Currently, in any CKKS configuration all the ciphertexts have the same chosen number of slots, which is a power of 2, e.g., $2^{15}$ or $2^{16}$ slots. When multiplying, for example, two ciphertexts A and B with $2^{16}$ slots each, the result is a ciphertext C of $2^{16}$ slots containing the products of the corresponding $2^{16}$ pairs of slots from A and B.

Figure 3:
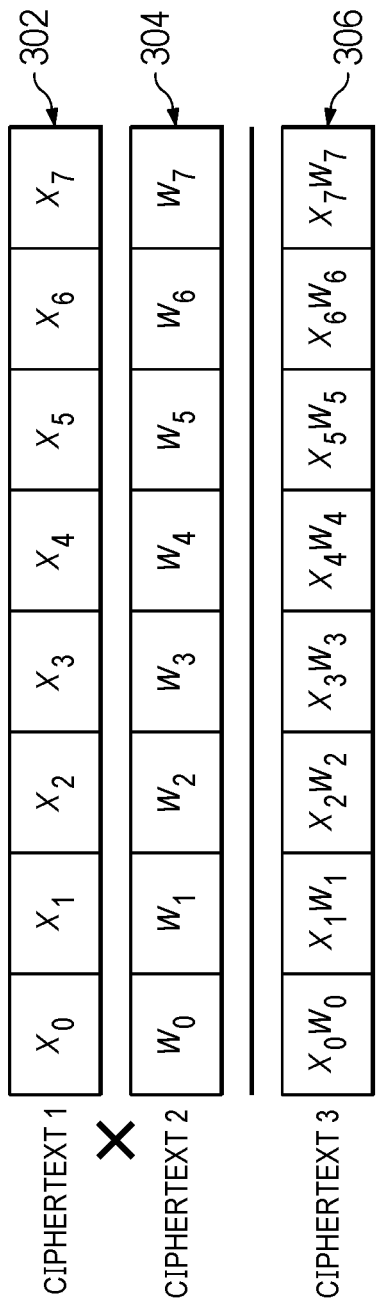
FIG. 3 depicts a diagram illustrating an example of SIMD packing which can be applied in the illustrative embodiments.

FIG. 3 depicts a diagram illustrating an example of SIMD packing which can be applied in the illustrative embodiments. In this simple example, two ciphertexts, Ciphertext 1 302 and Ciphertext 2 304 each comprise eight slots ($2^3$). By performing elementwise multiplication between Ciphertext 1 302 and Ciphertext 2 304, it is possible to pack the elements of both ciphertexts into a single vector, Ciphertext 3 306. The resultant Ciphertext 3 306 also comprises eight slots. Each slot position in Ciphertext 3 306 contains the elementwise product of the respective elements of the corresponding slot position in both factor ciphertexts 302, 304. Therefore, in the present example, the first (left most) slot in Ciphertext 3 306 contains the elementwise product $x_0w_0$ of the element $x_0$ in the first slot of Ciphertext 1 302 and the element $w_0$ in the first slot of Ciphertext 2 304. Similarly, the second slot in Ciphertext 3 306 contains the elementwise product $x_1w_1$ of the element $x_1$ in the second slot of Ciphertext 1 302 and the element $w_1$ in the second slot of Ciphertext 2 304, etc., down the line for all slots.

Figure 4:
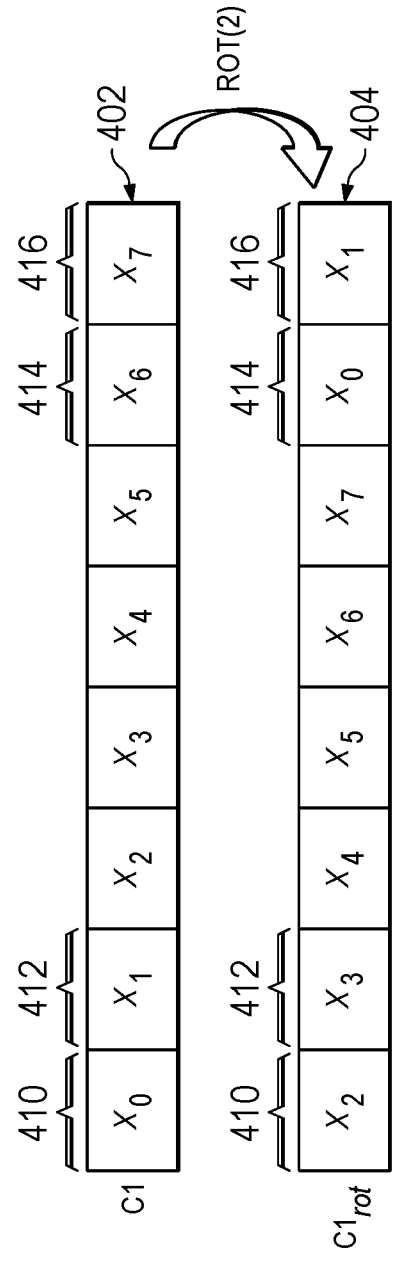
FIG. 4 depicts a diagram illustrating rotation of a ciphertext with which the illustrative embodiments can be implemented.

FIG. 4 depicts a diagram illustrating rotation of a ciphertext with which the illustrative embodiments can be implemented. HE supports rotate operations on a ciphertext in which the contents of slots are rotated by a specified number to the left or to the right (e.g., by 2 or by-2, respectively) to produce a vector that has the same number of slots but with the contents in different slot positions than the original ciphertext vector. For a ciphertext C and integer n, the rotation (C, n) returns a ciphertext that encrypts the same vector of slots as C, but the contents of all the slots are now rotated n slots to the left.

In the example shown in FIG. 4, ciphertext C1 402 undergoes a rotate operation $Rot_2$ which rotates the content of all slots to the left by 2. Therefore, the contents x0, x1 of the first two slots 410, 412, respectively, are moved to the last two slots 414, 416, and the contents x2, x3 are moved two slots to the left, resulting in ciphertext $C1_{rot}$ 404.

It is possible to pack matrices and vectors using different representations (shapes) depending on context.

Figure 5:
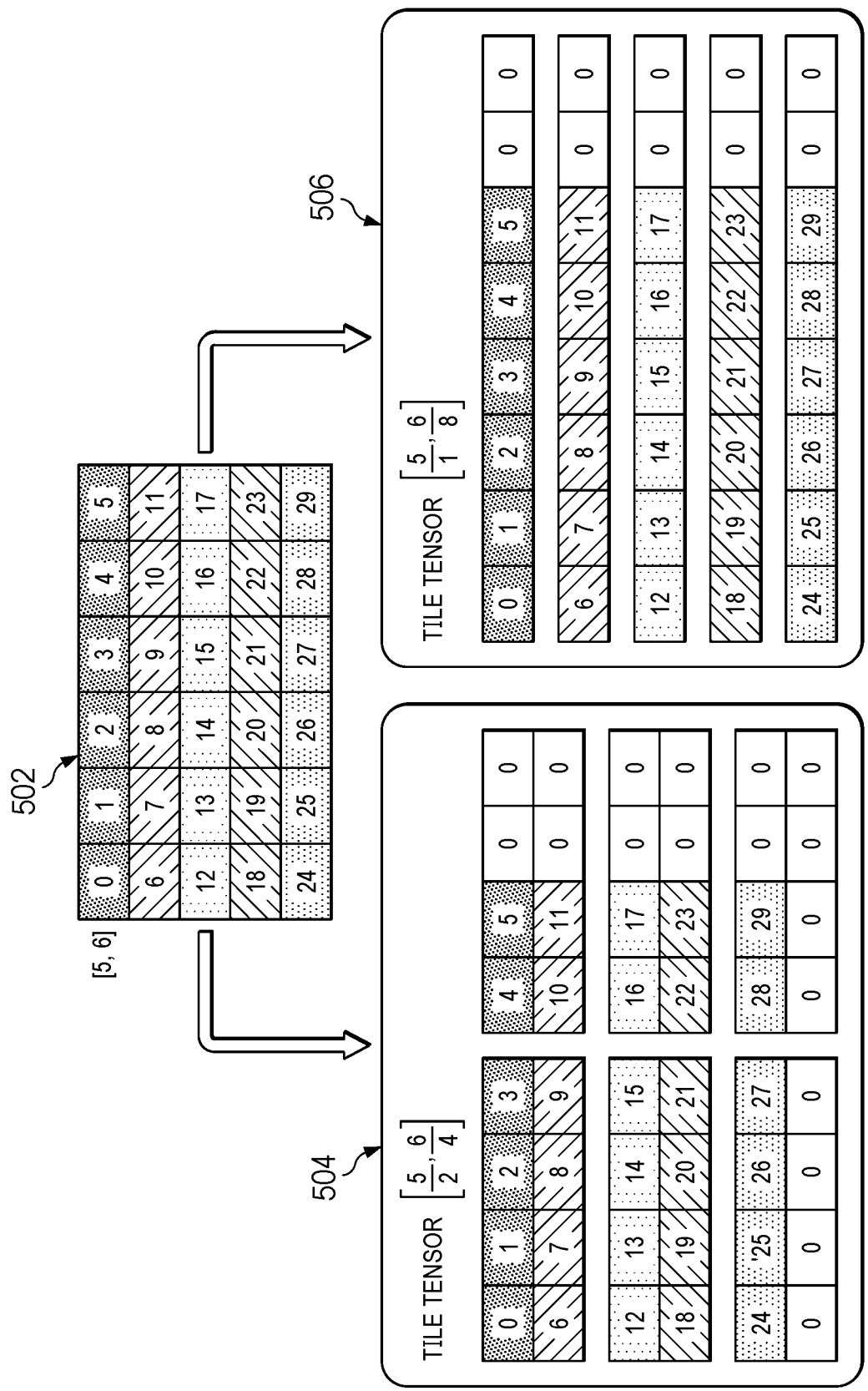
FIG. 5 depicts a diagram illustrating examples of packing a matrix using tile tensors of different shapes with which the illustrative embodiments can be implemented.

FIG. 5 depicts a diagram illustrating examples of packing a matrix using tile tensors of different shapes with which the illustrative embodiments can be implemented. A tile tensor is a general purpose data structure that allows user to store tensors of arbitrary shape and sizes. The tile tensor automatically packs the tensor data into a collection of tiles of fixed size, as required in HE environments.

Tile tensors are described by their shape. Tile tensor shapes describe both the shape of the tensor that is packed inside as well as the packing details. Tensors are multidimensional arrays. In the present example, tensor 502 is a 5×6 matrix (5 denoting the number of rows and 6 denoting the number of columns), which is denoted [5, 6]. Tile tensors 504 and 506 are compound objects that contain a tensor 502 packed within tiles. A tile is a one dimensional vector of numbers which can be operated on in SIMD (elementwise) fashion. As is common in HE system, the term "slot" refers to the individual cells of a tile. For example, a tile of length 8, as in the current example of tile tensor 506, has 8 slots, each of which can hold a number. In other examples, tiles can have the same sizes of a ciphertext, which can be, e.g., $2^{14}$, $2^{15}$, $2^{16}$, etc.

The shapes of tile tensors 504 and 506 are denoted $$\left[\frac{5}{2}, \frac{6}{4}\right] \text{ and } \left[\frac{5}{1}, \frac{6}{8}\right],$$

respectively. In the shape notation of the tile tensors 504, 506 the numbers above the fraction line (numerators) denote the shape of the original packed tensor 502, and the numbers below the fraction line (denominators) denote the shape of the tiles comprising the tile tensors.

Therefore, the shape notation $$\left[\frac{5}{2}, \frac{6}{4}\right]$$

of tile tensor 504 specifies that the original tensor 502 is a matrix of shape [5, 6], and the tiles into which it is packed are themselves matrices of shape [2, 4] (i.e. 2×4). The number of tiles used in a tile tensor depends on how many of them, given their shape, are needed to accommodate the original matrix. In the example of tile tensor 504, comprising tiles of the shape [2, 4], the number of tiles needed to accommodate tensor 502 is six. Unused slots are set to 0. The six tiles of tile tensor 504 form a two dimensional array of size 3×2. This array is called an external tensor, which is a tensor in which each element is a tile.

In the other example, tile tensor 506 comprises five 1×8 tiles. Therefore, the shape $$\begin{bmatrix} 5, & 6 \\ 1, & 8 \end{bmatrix}$$

of tile tensor 506 specifies that the original tensors 502 of shape [5, 6] is packed into tiles of shape [1, 8] (i.e., 1×8). Therefore, in this example, each row of tensor 502 is stored in its own separate tile in tile tensor 506. Because the tile size is 8, only six slots are filled with data from the original tensor 502. Therefore, the unused slots are set to 0, similar to tile tensor 504.

Generally, any tensor can be packed into a tile tensor with tiles of any size. The manner in which a tensor is packed into tiles will affect the way it can be manipulated. Once arrangement may be better suited for one type of calculation, whereas another type of calculation may favor a different arrangement.

Figure 6:
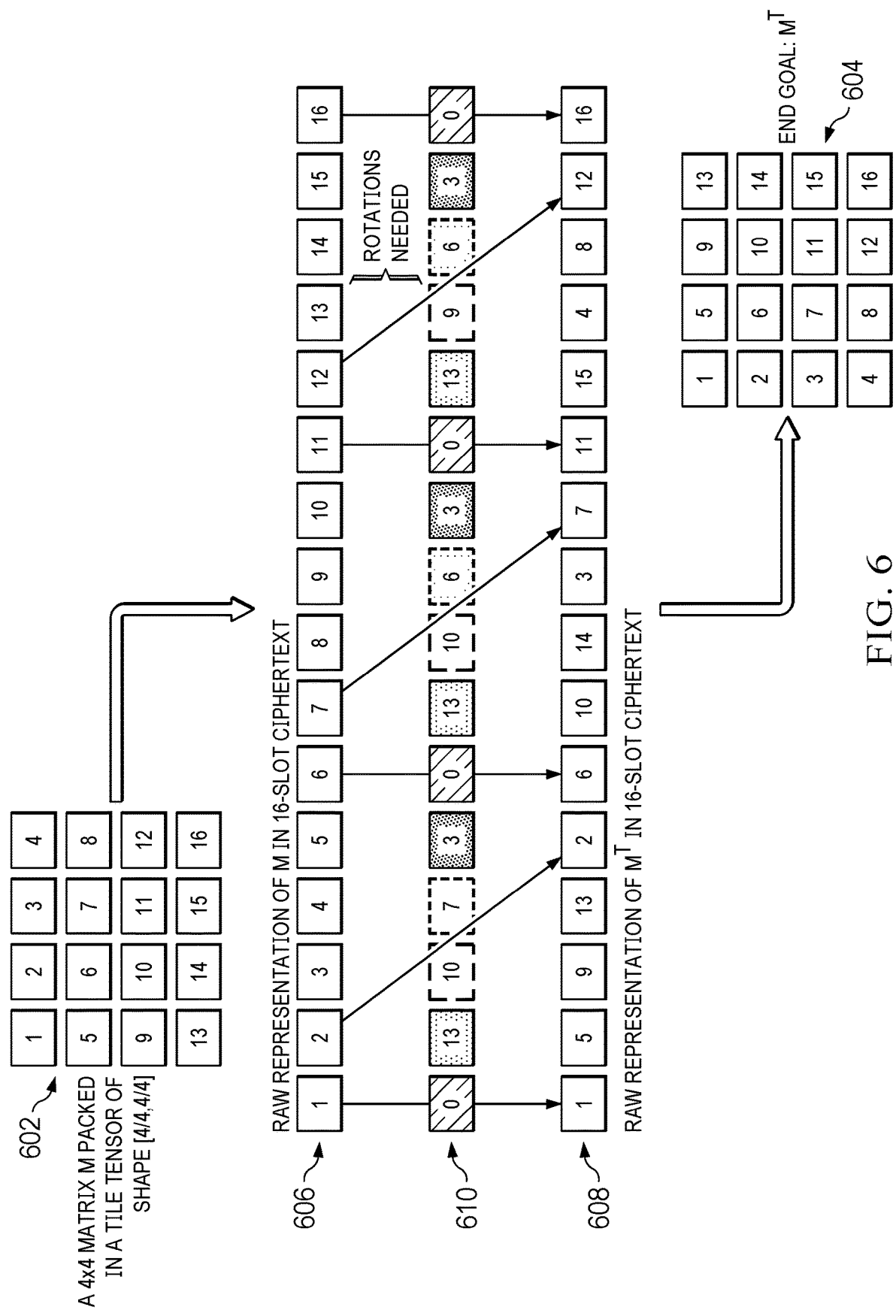
FIG. 6 depicts a diagram illustrating an example of tensor reshaping to which the illustrative embodiments can be applied.

FIG. 6 depicts a diagram illustrating an example of tensor reshaping to which the illustrative embodiments can be applied. In this example, tile tensor M 602 is the starting point with a shape of $$\begin{bmatrix} 4, & 4 \\ 4, & 4 \end{bmatrix},$$

meaning a 4×4 matrix has been packed within a tile tensor with tiles of size 4×4. Because the dimensions of both the original tensor and the tile are the same, tile tensor M 602 comprises a single tile.

Tile tensor $M^T$ 604 is M transposed and is the end goal of the reshaping. For ease of illustration, tile tensor $M^T$ 604 also has a shape $$\begin{bmatrix} 4, & 4 \\ 4, & 4 \end{bmatrix}.$$

The difference between Source tile tensor M 602 and Target tile tensor $M^T$ 604 is the respective positions of data in the slots of the tensors.

The transformation between starting tile tensor M 602 and ending tile tensor $M^T$ 604 can be more easily understood by representing them as 16-slot ciphertexts. Tile tensor M 602 is represented by ciphertext 606, and tile tensor $M^T$ 604 is represented by ciphertext 608. Rotation vector 610 between ciphertexts 606 and 608 contains the respective rotations indices needed to move each element (content) from its slot position in ciphertext 606 to its slot position in ciphertext 608. Each number in rotation vector 610 denotes the number of slots that a number in ciphertext 606 is rotated to the left in ciphertext 608. For example, the number 2 in the second slot of ciphertext 606 is rotated 13 slots to the left in ciphertext 608. This is denoted by the number 13 in the second slot of rotation vector 610 directly below it. Numbers 1, 6, 11, and 16 do not change slot positions between ciphertext 606 and ciphertext 608. Therefore, the corresponding rotation numbers in rotation vector 610 are 0.

Because different elements in ciphertext 606 have to be rotated by different numbers of slots to generate ciphertext 608, a single same rotation cannot be applied to all the elements like the simple example shown in FIG. 4. Therefore, each unique rotation number in rotation vector 610 requires the application of a respective mask to ciphertext 606.

FIG. 7 depicts a diagram illustrating application of a ciphertext mask with which the illustrative embodiments can be implemented. A mask is a plaintext or ciphertext vector wherein each slot is 1 or 0. A 1 is placed in the respective slot positions of elements that are to be selected from a ciphertext. Continuing the example from above, if the elements in ciphertext 606 rotated by 13 are to be selected, the corresponding mask 702 comprises a 1 in slots 2, 7, and 12, with the rest of the slots being 0. When ciphertext 606 and mask 702 are multiplied elementwise, the resulting ciphertext 704 comprises 0s in all slots except slots 2, 7, and 12. Rotation by 13 is then applied to ciphertext 704. A similar process is repeated for each unique rotation, and the resulting ciphertexts are added together to generate ciphertext 608.

It should be noted that in the CKKS scheme the mask holds an approximate value of 0 or 1. In other HE schemes, the mask might hold exactly 0 or 1.

In the specific example shown in FIG. 6, the transformation from ciphertext 606 to ciphertext 608 requires 7 masks and 6 rotations (not counting rotation by 0 for slots 1, 6, 11, and 16). Because rotations are expensive operations, the illustrative embodiments seek to minimize the overall number of unique rotations required to perform the transformation.

Figure 8:
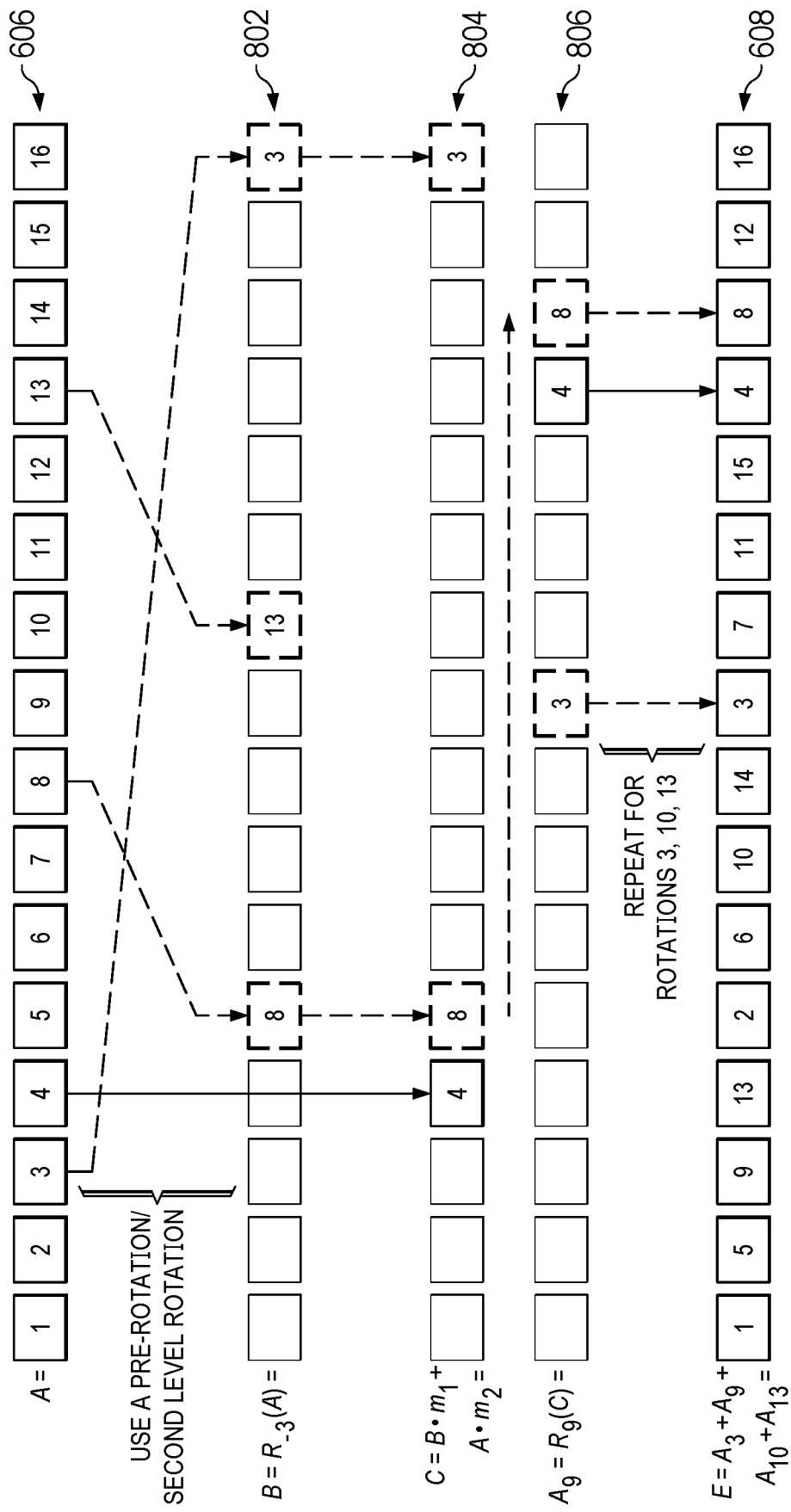
FIG. 8 depicts a diagram illustrating a method of tensor reshaping using pre-rotation and second level rotation in accordance with an illustrative embodiment.

FIG. 8 depicts a diagram illustrating a method of tensor reshaping using pre-rotation and second level rotation in accordance with an illustrative embodiment. The method illustrated in FIG. 8 reduces the total number of required unique rotations for a tensor reshaping by merging rotations.

Taking the example of elements 3 and 8 in ciphertext 606, a rotation by 10 is required to move them to their respective positions (slots) in ciphertext 608. Rather than doing a rotation by 10, the method illustrated in FIG. 8 first rotates them by 3, then rotates them by 7. A mask is applied to ciphertext 606 to isolate 3, 8, and 13, which are then rotated to the left by 3, to generate ciphertext 802.

A new mask is applied to ciphertext 606 to isolate 4, and another mask is applied to ciphertext 802 to remove 13. The resulting ciphertexts (not shown) are summed to generate ciphertexts 804. 13 is removed at this point because it has to be rotated by an additional 6 slots to arrive at its location in ciphertext 608, whereas 3 and 8 have to be rotated by an additional 7. Therefore, 13 will later be combined with the rotation of elements 9 and 14, which also require a rotation by 6 from ciphertext 606 to ciphertext 608. Similarly, element 4 is added to ciphertext 804 because it, like elements 3 and 8, requires rotation by 7 between ciphertext 606 and ciphertext 608.

Ciphertext 804 is then rotated to the left by 7 (or equivalently to the right by 9), generating ciphertext 806, which corresponds to the positions of elements 4, 8, and 3 in their respective slots in ciphertext 608. The process is repeated for the remaining rotations, and the resulting vectors are summed to generate ciphertext 608. By performing the initial rotation by 3 for elements 3, 8, and 13, two rotations (9 and 10) are saved.

Specifically, referring back to rotation vector 610 in FIG. 6:

4 requires rotation by 7 to the left
    3 and 8 require rotation by 10 to the left
    13 requires rotation by 9 to the left
    9 and 14 require rotation by 6 to the left By using the method illustrated in FIG. 8, by first rotating 3, 8, and 13 by 3 to the left:
- 3, 8, and 4 require rotation by 7 to the left
- 13, 9, and 14 require rotation by 6 to the left As a result, rotations by 3, 6, and 7 are performed instead of 6, 7, 9, and 10.

Therefore, whereas the approach shown in FIG. 6 required 7 masks and 6 rotations to transform ciphertext 606 into ciphertext 608, the process in FIG. 8 requires a total of 7 masks (multiplications) and only 5 unique rotations.

Stated more formally, given input of a source tile tensor (S), and an element mapping (M) associated with a target tile tensor (T) and its shape, for every tile S[t] in the source tile tensor a rotation vector $R_t$ (e.g., rotation vector 610 in FIG. 6) is computed that contains all the required rotations to transform the source(S) into the target (T) according to the mapping (M).

A list of $U_t$ of unique rotations within $R_t$ is then compiled. Referring back to the example in FIG. 6, the unique rotations in rotation vector 610 are 0, 3, 6, 7, 9, 10 and 13. The list $U_t$ of unique rotations to be applied to the ciphertexts is analyzed and split into two lists, $PreU_t$, which are unique rotations that are applied first to the ciphertexts (with relevant masks), and PostUt, which are applied after the $PreU_t$ rotations (also with relevant masks). Referring to the example in FIG. 8:

$$U_t = \{6, 7, 9, 10\}$$

$$PreU_t = \{3\} \text{ because it is performed first}$$

$$PostU_t = \{6, 7\}$$

For each rotation q in the $PreU_t$ list, the process computes $$t_q = Rot_q(S[t])$$

where $t_q$ is a ciphertext that encrypts a vector with the same values in source tile S[t] but cyclically rotated by q slots. Referring again to the example in FIG. 8, ciphertext 802 is $t_q$ for rotation by 3, wherein q is 3.

After $t_q$ is computed, a mask $m^{t_q,r,w}$ is generated for each rotation r in the $PostU_t$ list and slot w in a corresponding target tile T[w], where $m^{t_q,r,w}=1$ if $R[i]=r+q$ mod $n$ and $M$ maps $t[i]$ to $w$, and 0 otherwise where $R_t$ [i] is the rotation needed to move an element from position i in the source tile to position w in the target tile, $R_t$ [i]=w−i mod n.

Using a simple example, for a source vector $$a = [1, 2, 3, 4, 5, 6]$$

Moving the second element (2) to the fifth slot requires rotating by 5−2=3 (three rotations to the right). To move the second element to the first position requires rotating by 1−2=−1 (one rotation to the left, or equivalently 6−1=5 rotations to the right).

If $R_t$ [i] is split into two rotations r ($PostU_t$ list) and q ($PreU_t$ list), one would expect that r+q=$R_t$ [i] again modulo n.

The products of each rotation with its corresponding mask are summed to produce the target tile tensor (e.g., ciphertext 608), which is expressed as $$T[w] = \sum_{t,r,q} Rot_r(t_q) \cdot m^{t_q,r,w}$$

Figure 9:
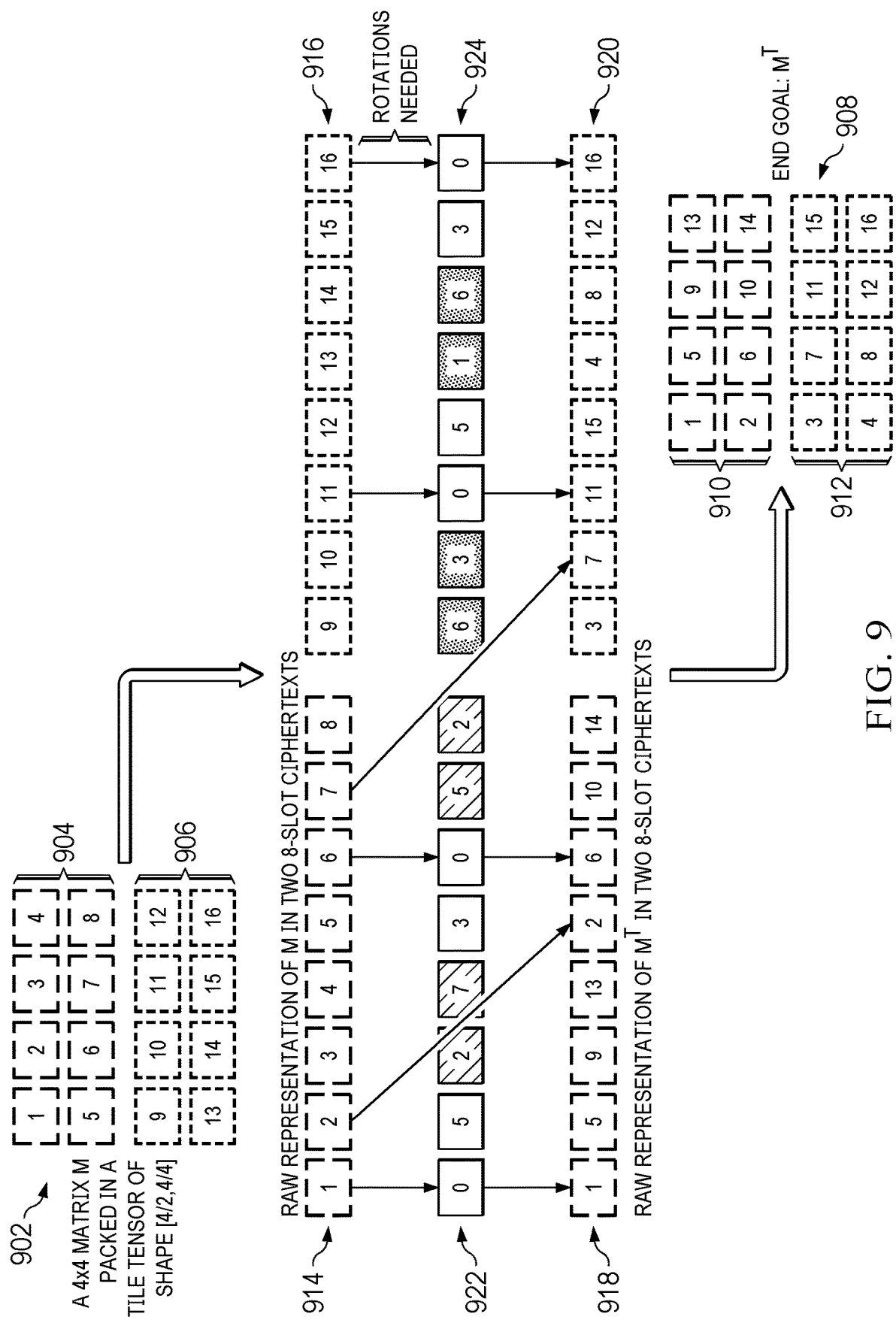
FIG. 9 depicts another example of tensor reshaping to which the illustrative embodiments can be applied.

FIG. 9 depicts another example of tensor reshaping to which the illustrative embodiments can be applied. Similar to FIG. 6, in this example, the source tile tensor M 902 also comprises a total of 16 slots. However, in this example, tile tensor M 902 has $$\left[\frac{4}{2}, \frac{4}{4}\right],$$

a shape of meaning a 4×4 matrix has been packed within a tile tensor with tiles of size 2×4. Therefore, rather than comprising a single 4×4 tile as in the case of FIG. 6, M 902 comprises two 2×4 tiles 904, 906.

Tile tensor $M^T$ 908 is M transposed and is the target of the reshaping as with the example above. Tile tensor $M^T$ 908 also has a shape $$\left[\frac{4}{2}, \frac{4}{4}\right],$$

comprises two 2×4 tiles, 910, 912.

Again, the transformation between source tile tensor M 902 and target tile tensor $M^T$ 908 can be more easily understood by representing them as ciphertexts. However, because both M 902 and $M^T$ 908 each comprise two tiles, they are each represented by two 8-slot ciphertexts rather than a single 16-slot ciphertext.

Tile tensor M 902 is represented by ciphertexts 914 and 916, and tile tensor $M^T$ 908 is represented by ciphertexts 918 and 920. Rotation vectors 922 and 924 contain the respective rotations indices needed to move each element from its slot position in ciphertexts 914 or 916 to its slot position in ciphertexts 918 or 920. Each number in rotation vectors 922 and 924 denotes the number of slots that an element in ciphertext 914 or 916 is rotated to the left in ciphertext 918 or 920. However, unlike FIG. 6, this example has the additional complexity that an element might also be moved to another ciphertext (which is indicated by shaded slots in rotation vectors 922 and 924).

For example, the number 3 in the third slot of ciphertext 914 is rotated 2 slots to the left and is also moved to ciphertext 920. Therefore, 3 is moved from the third slot in ciphertext 914 to the first slot in ciphertext 920. This corresponds to 3 moving from the third slot in the first tile 904 of M 902 to the first slot in the second tile 912 of $M^T$ 908. Similarly, numbers 4, 7 and 8 are rotated by 7, 5, and 2, respectively, and moved to those corresponding slot positions in ciphertext 920. Conversely, numbers 9, 10, 13, and 14 in ciphertext 916 are rotated by 6, 3, 1, and 6, respectively, and moved to those corresponding slots in ciphertext 918.

In the example shown in FIG. 9, the transformation from ciphertexts 914 and 916 to ciphertexts 918 and 920 requires 10 masks (multiplications) and 8 rotations (again, not counting rotation by 0 for slots 1, 6, 11, and 16). As with the example above, by combining rotations, the total number of rotations can be reduced.

Figure 10:
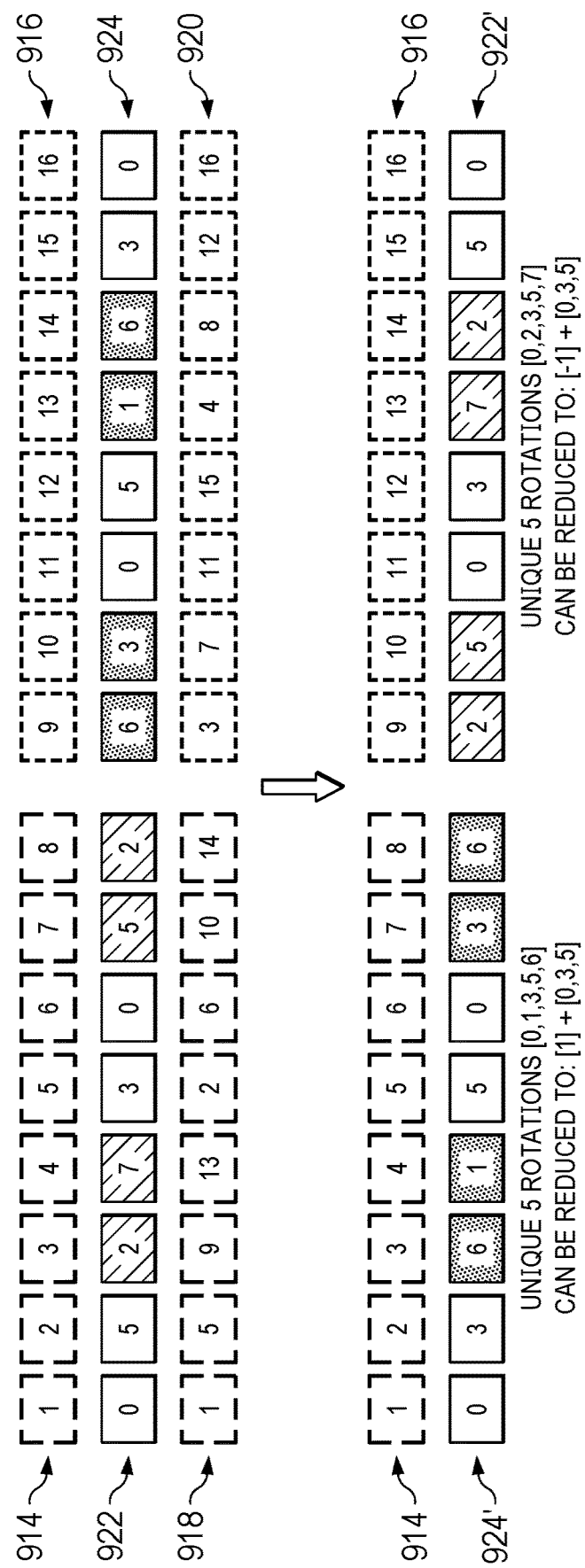
FIG. 10 depicts a diagram illustrating the method of tensor reshaping using pre-rotation and second level rotation applied to multi-tile tensors in accordance with an illustrative embodiment.

FIG. 10 depicts a diagram illustrating the method of tensor reshaping using pre-rotation and second level rotation applied to multi-tile tensors in accordance with an illustrative embodiment. In this example, the rotation vectors 922 and 924 are reversed in order and placed under the opposite source ciphertexts.

Therefore, rotation vector 922 is reversed and placed under ciphertext 916 and represented as rotation vector 922'. (It should be noted that the reversal is used in this example to facilitate illustration and is a phenomenon of transposing a matrix. Some symmetries and other transformations that may not yield such a reversed rotation vector.) With this reversal, rotation vector 922' indicates the number of slots that the elements in ciphertext 916 are rotated to the right. The shaded slots in rotation vector 922' indicate that the corresponding element in ciphertext 916 is also moved to the corresponding slot position in ciphertext 918 after the rotations to the right. Similarly, rotation vector 924 is reversed and placed under ciphertext 914 and represented as rotation vector 924'.

Rotation vector 924' indicates the number of slots that the elements in ciphertext 914 are rotated to the right. The shaded slots in rotation vector 924' indicate that the element in question is also moved to the corresponding slot position in ciphertext 920 after the rotations to the right.

Rotation vector 924' comprises five unique rotations:

$$U_t = \{0, 1, 3, 5, 6\}$$

In ciphertext 914, elements 3 and 8 need to be rotated by 6 to the right. Element 4 needs to be rotated by 1 to the right. By initially rotating elements 3, 4, 8 to the right by 1, element 4 can then be combined with the rotation by 0 of elements 1 and 6. Similarly, elements 3 and 8 can then be combined with the rotation by 5 to the right of element 5. Therefore:

$$PreU_t = \{1\}$$
$$PostU_t = \{0, 3, 5\}$$

resulting in a net reduction of one rotation.

Rotation vector 922' also comprises five unique rotations:

$$U = \{0, 2, 3, 5, 7\}$$

In ciphertext 916, elements 9 and 14 need to be rotated by 2 to the right, and element 13 needs to be rotated by 7 to the right. By initially rotating elements 9, 13, and 14 to the left by 1, elements 9 and 14 can be combined with the rotation by 3 to the right of element 12. Similarly, element 13 can then be combined with the rotation by 0 of elements 11 and 16. Therefore:

$$PreU_t = \{-1\}$$
$$PostU_t = \{0, 3, 5\}$$

again resulting in a net reduction of one rotation.

Therefore, whereas the approach shown in FIG. 9 required 10 masks and 8 rotations to transform ciphertexts 914 and 916 into ciphertexts 918 and 920, the process in FIG. 10 requires a total of 10 masks (multiplications) and only 6 unique rotations (not counting the rotation by 0).

Figure 11:
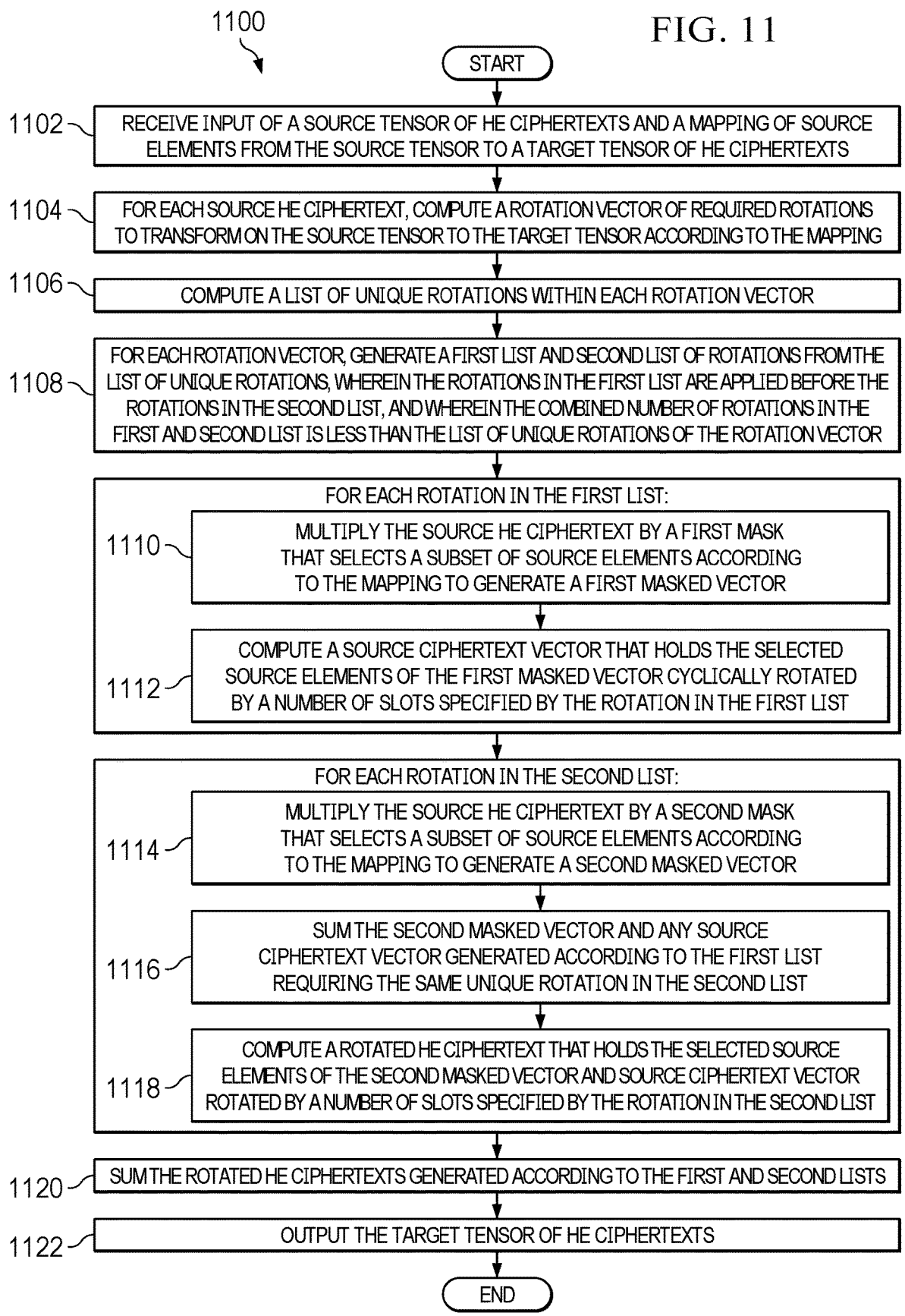
FIG. 11 depicts a flowchart illustrating a method of reducing homomorphic encryption rotations in accordance with an illustrative embodiment.

FIG. 11 depicts a flowchart illustrating a method of reducing homomorphic encryption rotations in accordance with an illustrative embodiment. Process 1100 can be performed by repacking encrypted data system 180 in FIG. 1.

Process 1100 begins by receiving input of a source tensor of HE ciphertexts and a mapping of source elements from the source tensor to a target tensor of HE ciphertexts (step 1102).

For each source HE ciphertext, process 1100 computes a rotation vector of required rotations to transform on the source tensor to the target tensor according to the mapping (step 1104).

Process 1100 computes a list of unique rotations ($U_t$) within each rotation vector (step 1106).

For each rotation vector, process 1100 generates a first list ($PreU_t$) and second list ($PostU_t$) of rotations from the list of unique rotations, wherein the rotations in the first list are applied before the rotations in the second list, and wherein the combined number of rotations in the first and second list is less than the list of unique rotations of the rotation vector (step 1108).

For each rotation in the first list, process 1100 multiplies the source HE ciphertext by a first mask that selects a subset of source elements according to the mapping to generate a first masked vector (step 1110) and computes a source ciphertext vector that holds the selected source elements of the first masked vector cyclically rotated by a number of slots specified by the rotation in the first list (step 1112).

For each rotation in the second list, process 1100 multiplies the source HE ciphertext by a second mask that selects a subset of source elements according to the mapping to generate a second masked vector (step 1114), sums the second masked vector and any source ciphertext vector generated according to the first list requiring the same rotation in the second list (step 1116), and computing a rotated HE ciphertext that holds the selected source elements of the second masked vector and source ciphertext vector rotated by a number of slots specified by the unique rotation in the second list (step 1118).

Process 1100 summing the rotated HE ciphertexts generated according to the first and second lists (step 1120) and output the target tensor of HE ciphertexts (step 1122).

Process 1100 can be called recursively in which the second list of rotations ($PostU_t$) is set as the list of unique rotations ($U_t$) in step 1106 in the next iteration. The cost of each recursive iteration is an increase in multiplication depth. The recursion can end for several reasons. The recursion may end upon reaching a specified maximum multiplication depth. Alternatively, when the list of unique rotations ($U_t$) can no longer be split into two lists there is no point of adding a new layer (performing another iteration). Alternatively, the latency tradeoff of adding another layer (iteration) can be computed. When an added value decreases below zero, the recursion ends with the previous iteration. For example, a number of iterations might have the following latencies:

1 iteration: 10 milliseconds
2 iterations: 8 milliseconds
3 iterations: 6 milliseconds
4 iterations: 6.5 milliseconds In the example, each iteration through 3 reduces the latency, but moving from 3 iterations to 4 increases the latency from 6 milliseconds to 6.5, representing a reduction of speed of −0.5 milliseconds. Stated differently (and somewhat awkwardly), the reduction of latency becomes negative. Therefore, in this example, it is preferable to stop the recursion at 3 iterations.

Process 1100 then ends.

The process of generating $PreU_t$ and $PostU_t$ from $U_t$ involves the creation of a dictionary of keys that specify actions to be applied to the unique rotations in a rotation vector. Referring back to the example in FIG. 10, the respective rotation vectors are:

$$R_1(924') = [0, 3, 6, 1, 5, 0, 3, 6]$$

$$R_2(922') = [2, 5, 0, 3, 7, 2, 5, 0]$$

From these rotation vectors, two respective lists of unique rotations are derived:

$$U_1 = [0, 1, 3, 5, 6]$$

$$U_2 = [0, 2, 3, 5, 7]$$

In this example, the number of unique rotations in each list is the same:

$$|U_1| = |U_2| = 5$$

For each list of unique rotations, a dictionary is generated that denotes a dictionary key to be applied to each rotation in the list.

For $U_1$, the dictionary is:

$$D_1 = [00:T, 01:T, 3:T, 05:T, 06:T]$$

For $U_2$, the dictionary is:

$$D_2 = [00:T, 02:T, 03:T, 05:T, 07:T]$$

where the letter after each colon denotes the dictionary key. Initially, these key values can be set to T, indicating the rotation in question is open to attempt application of the maximum rotation index.

The dictionary keys can have several values that denote what action should be performed on a given unique rotation in the list. For example, the possible dictionary key values might be, for example:

$$D[key] = \begin{cases} V & \text{Apply the max rotation index} \\ T & \text{Try the max rotation index} \\ X & \text{Do not apply the max rotation index} \end{cases}$$

The maximum rotation index (maxRotIdx) denotes the preliminary rotation to be applied to ciphertext elements in order to merge rotations.

Again, referring to the example of in FIG. 10, for $U_1$:

maxRotIdx$_1$=1 rotation to the left which is applied to rotations 1 and 6 to the left to merge them with rotations 0 and 5, as explained above. Therefore:

$$rotElms_1 = [1\ 6]$$

which denotes the unique rotations that can be removed from $U_1$.

Therefore, the dictionary key values for 1 and 6 are set to V according to the list of key values above:

$$D_1 = [00:T, 01:V, 3:T, 05:T, 06:V]$$

Because rotations 1 and 6 are being merged with rotations 0 and 5, those rotations should not be changed, which would negate the benefit of performing the preliminary rotation on 1 and 6. Therefore, the dictionary key values for 0 and 5 are set to X:

$$D_1 = [00:X, 01:V, 3:T, 05:X, 06:V]$$

Because rotation 3 is not merged with the other rotations, there is no conflict in attempting to apply maxRotIdx$_1$. However, there is no net reduction of rotations from applying a preliminary rotation of 1 to the source elements that are rotated by 3 in order to place those source elements in their proper positions in the target ciphertext. In other words, there is no better option than keeping the unique rotation of 3 in $U_1$. Therefore, the dictionary key values for $U_1$ stays at:

$$D_1 = [00:X, 01:V, 3:T, 05:X, 06:V]$$

The number of rotation elements that are removed from $U_1$ as a result of application of maxRotIdx$_1$ is:

$$|rotElms_1| = 2$$

Applying the same process to $U_2$ produces:

maxRotIdx$_2$=1 rotation to the right $$rotElms_2 = [2\ 7]$$

$$|rotElms_2| = 2$$

Therefore, the dictions key values for $U_2$ are:

$$D_2 = [00:X, 02:V, 03:X, 05:T, 07:V]$$

The example shown above depicts a situation in which there only one iteration is required in $PreU_t$. For situations with more than one maximum rotation index value in $PreU_t$, the possible dictionary key values increase accordingly. For example, for two maxRotIdx values in $PreU_t$, the dictionary key values might be.

$$D[\text{key}] = \begin{cases} V & \text{Apply } maxRotIdx_1 \\ Y & \text{Apply } maxRotIdx_2 \\ T & \text{Try a max rotation index value} \\ X & \text{Do not apply a max rotation index value} \end{cases}$$

As a more complicated example, a list of unique rotations might be:

$$U = \begin{bmatrix} 01 & 02 & 03 & 04 & 06 & 07 & 08 & 09 & 11 & 12 & 14 & 15 & 16 & 20 & 22 & 26 \\ 27 & 28 & 30 & 31 & 32 & 34 & 36 & 38 & 39 & 43 & 44 & 45 & 46 & 48 & 49 & 50 \\ & & & & 53 & 54 & 56 & 57 & 59 & 60 & 61 & 62 & & & & \end{bmatrix}$$

wherein the number of unique rotations |U|=40. Initially, the dictionary key values are:

$D = [01:T, 02:T, 03:T, 04:T, 06:T, 07:T, 08:T, 09:T, 11:T, 12:T,$ $14:T, 15:T, 16:T, 20:T, 22:T, 26:T, 27:T, 28:T, 30:T, 31:T,$ $32:T, 34:T, 36:T, 38:T, 39:T, 43:T, 44:T, 45:T, 46:T, 48:T,$ $49:T, 50:T, 53:T, 54:T, 56:T, 57:T, 59:T, 60:T, 61:T, 62:T]$

Starting with a first maximum rotation index value of 1:

maxRotIdx$_1$=1 rotation to the right

In this example, the rotation elements to which maxRotIdx$_1$ is applied are:

$rotElms = [\;1\;\;3\;\;6\;\;8\;\;11\;\;14\;\;26\;\;30\;\;38\;\;43\;\;45\;\;48\;\;53\;\;56\;\;59\;\;61\;]$ Therefore:

$$|rotElms| = 16$$

As a result of applying maxRotIdx$_1$ to U, the dictionary key values in this example are:

$D=[01:V,02:X,03:V,04:X,06:V,07:X08:V,09:X,11:V,12:$
$X,14:V,15:X,16:T,20:T,22:T,26:V,27:X,28:T,30:V,$
$31:X,32:T,34:T,36:T,38:V,39:X,43:V,44:X,45:V,46:$
$X,48:V,49:X,50:T,53:V,54:X,56:V,57:X,59:V,60:X,$
$61:V,62:X]$

The elements that remain free on which to attempt a preliminary rotation are 16, 20, 22, 28, 32, 34, 36, and 50, since application of maxRotIdx$_1$ to these elements does not reduce the net number of rotations.

In this example, a second maximum rotation index value of 12 is then applied to U:

maxRotIdx$_2$=12 rotation to the right

In the present example, the rotation elements to which maxRotIdx$_2$ can be applied are:

$rotElms = [\;16\;\;20\;\;22\;]$ $|rotElms| = 3$

As a result of applying maxRotIdx$_1$ to U, the dictionary key values now become:

$D = [01:V, 02:X, 03:V, 04:X, 06:V, 07:X, 08:V,$ $09:X, 11:V, 12:X, 14:V, 15:X, 16:Y, 20:Y, 22:Y,$ $26:V, 27:X, 28:X, 30:V, 31:X, 32:X, 34:X, 36:t, 38:V,$ $39:X, 43:V, 44:X, 45:V, 46:X, 48:V, 49:X, 50:T,$ $53:V, 54:X, 56:V, 57:X, 59:V, 60:X, 61:V, 62:X]$

Therefore, in this example:

$PreU_t = [1, 12]$ $|PreU_t| = 2$ $PostU_t[02\;04\;07\;09\;12\;15\;27\;28\;31\;32\;34\;36\;39\;44\;46\;49\;50\;54\;57\;60\;62]$ $|PostU_t| = 21$ PostU$_t$ can be set to U in a subsequent iteration.

The savings in rotations from applying maxRotIdx$_1$ and maxRotIdx$_2$ can be expressed as a ratio to the original number of unique rotations in U:

$$\text{ratio} = \frac{21+2}{40} \sim 0.53$$

Thereby reducing the number of rotations by almost half.

Figure 12:
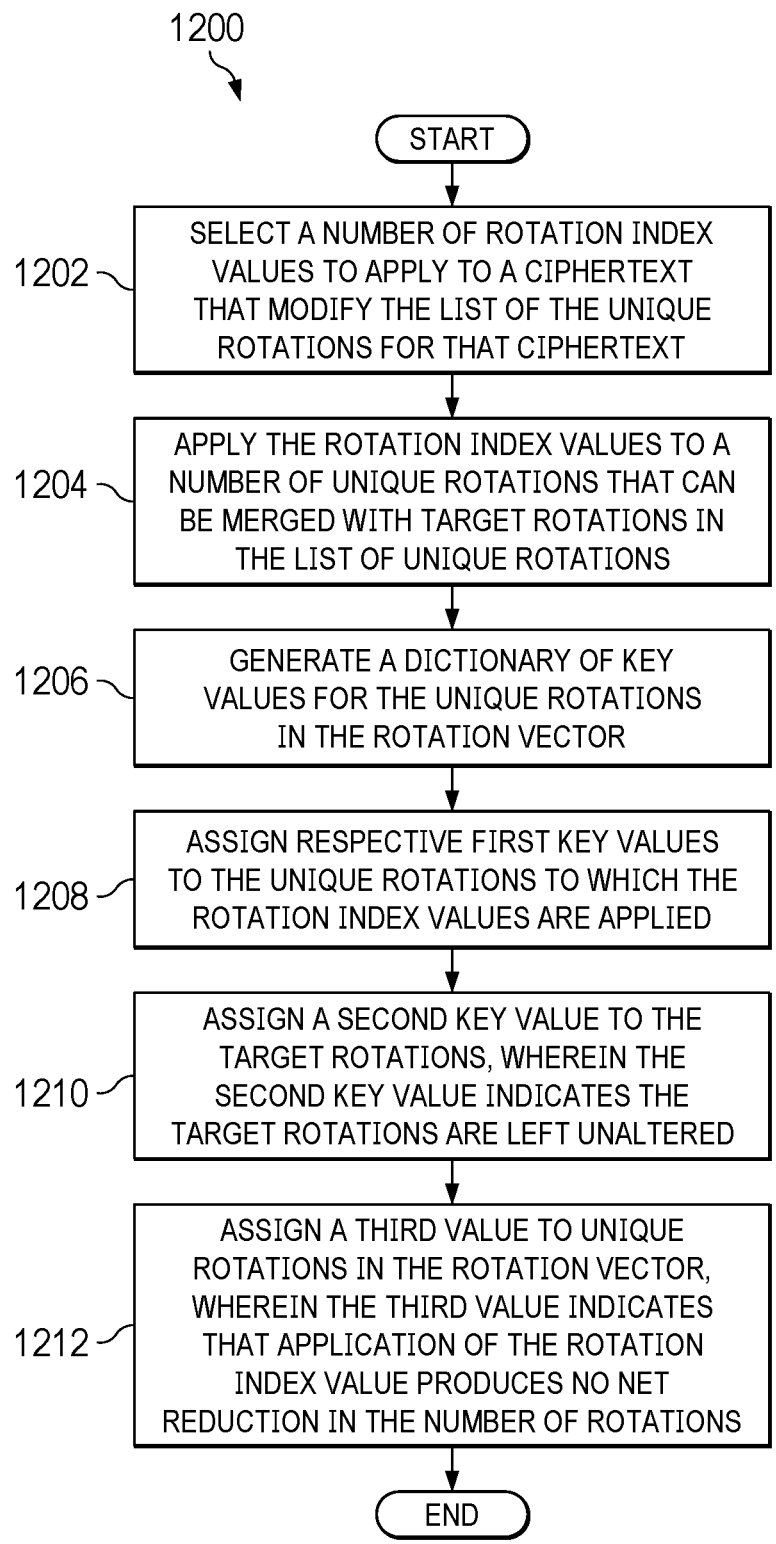
FIG. 12 depicts a flowchart illustrating a process for generating preliminary rotations and post rotations from a list of unique rotations of a rotation vector in accordance with an illustrative embodiment.

FIG. 12 depicts a flowchart illustrating a process for generating preliminary rotations and post rotations from a list of unique rotations of a rotation vector in accordance with an illustrative embodiment. Process 1200 is a detailed example of step 1108 in FIG. 11.

Process 1200 begins by selecting a number of rotation index values to apply to a ciphertext that modify the list of unique rotations for that ciphertext (step 1202). The rotation index values are applied to a number of unique rotations that can be merged with target rotations in the list of unique rotations (step 1204). The rotation index values comprise the first list of rotations.

Process 1200 generates a dictionary of key values for the unique rotations in the rotation vector (step 1206). Process 1200 then assigns respective first key values to the unique rotations to which the rotation index values are applied (step 1208) and assigns a second key value to the target rotations, wherein the second key value indicates the target rotations are left unaltered (step 1210).

Process 1200 then assigns a third value to unique rotations in the rotation vector, wherein the third value indicates that application of the rotation index value produces no net reduction in the number of rotations (step 1212). The rotations assigned the second value and third value comprise the second list of rotations. Process 1200 then ends.

Determining what value to use for maxRotIdx utilizes a greedy algorithm that tries different values of a rotation index r∈1 . . . n to determine their effects according to a cost metric calculated by a score function.

For each value of r, the algorithm determines whether rotation value in the dictionary for U$_t$ has an assigned dictionary key value. Responsive to a determination that the rotation value does not have key value and a potential target rotation value for merging also does not have an assigned value, the rotation to be changed is given a temporary key value (e.g., V) indicating application of the selection rotation index value, and the target rotation is assigned a temporary key value (e.g., X) indicating it is not to be altered. The rotation index value is applied to determine if its effect on the cost metric improves the total rotation count compared to other rotation index values. The value with the best score is selected and stored. In the case of a single rotation value of r (single iteration), a brute force approach can be applied. However, for multiple values of r (multiple iterations of the algorithm), a brute force trial-and-error approach can be costly in time and computational requirements.

Figure 13A:
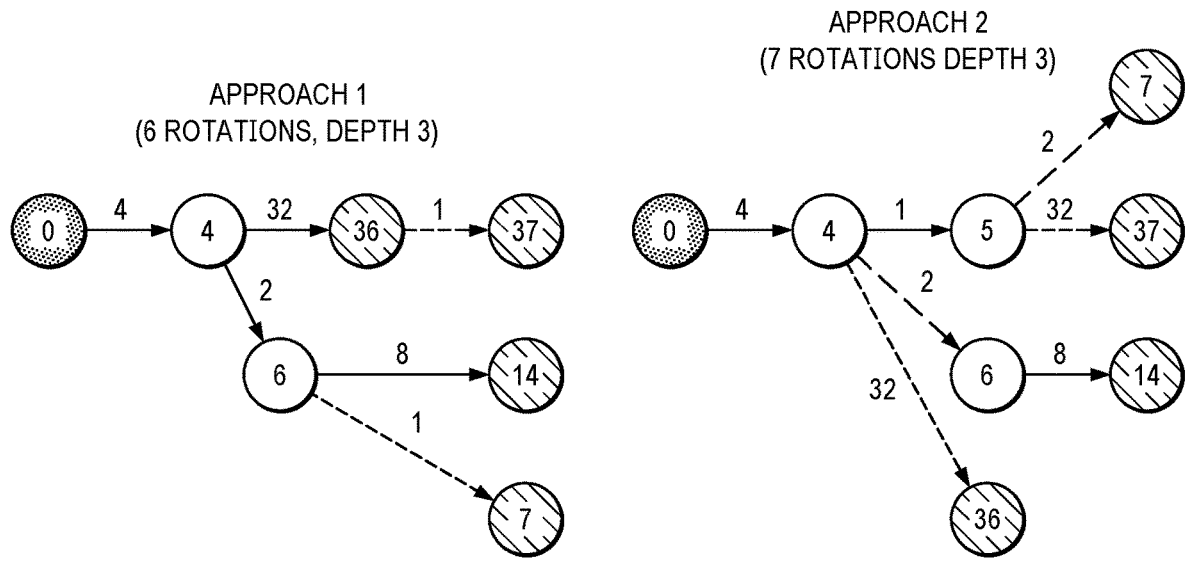
FIG. 13A depicts an example of alternate forest representations of rotations in a list of unique rotations of a rotation vector in accordance with an illustrative embodiment.

FIG. 13A depicts an example of alternate forest representations of rotations in a list of unique rotations of a rotation vector. The rotations in a rotation vector can be presented as a forest. Every rotation might require a unique rotation key, which should be prepared in advance before the computation. These keys can require significant storage comprising megabyte to gigabyte scale. To this end, only a subset of the keys may be generated (e.g., only the positive and negative power of 2, or only keys requiring a heavy HE bootstrapping operation). Forest representation is applicable in cases when not all of the rotations keys are available.

In the present example, the rotations {7, 14, 36, 37} using power of 2 are represented by two different forests applying different approaches. Approach 1 comprises 6 rotations with a depth of 3. Approach 2 comprises 7 rotations also with a depth of 3.

Figure 13B:
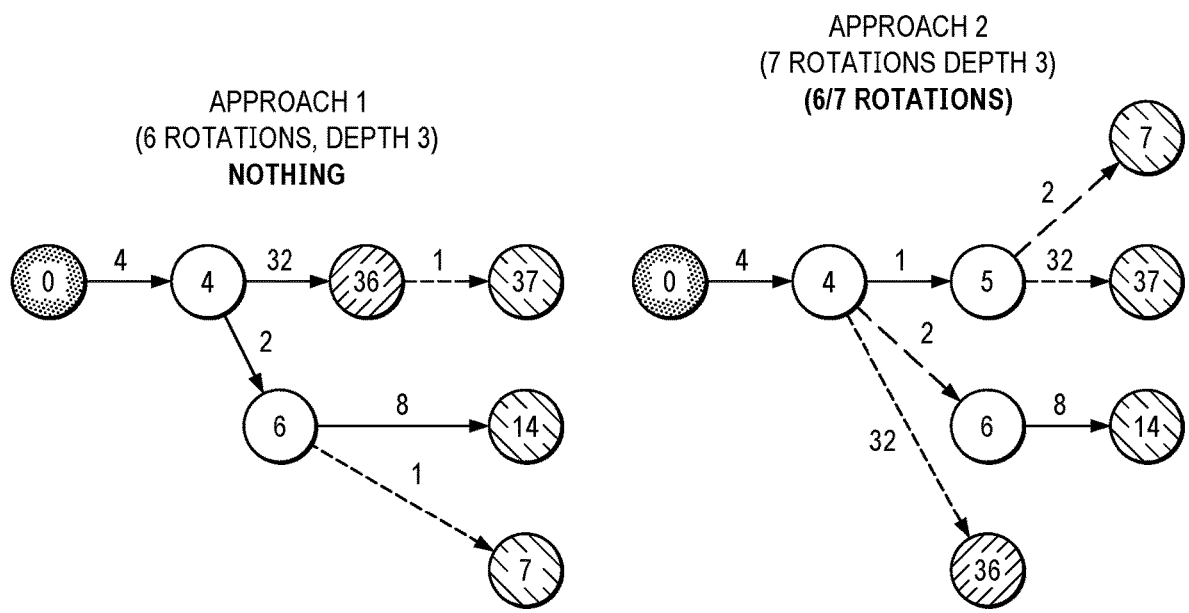
FIG. 13B depicts the consequences of removing a given rotation from each alternate forest representation in accordance with an illustrative embodiment.

FIG. 13B depicts the consequences of removing a given rotation from each alternate forest representation. In this example, the consequences of removing rotation 36 are shown for each approach. In Approach 1, removing rotation 36 produces no change in net rotations need to achieve the end result. However, removing rotation 36 from Approach 2 reduces the total rotations from 7 to 6.

Figure 14:
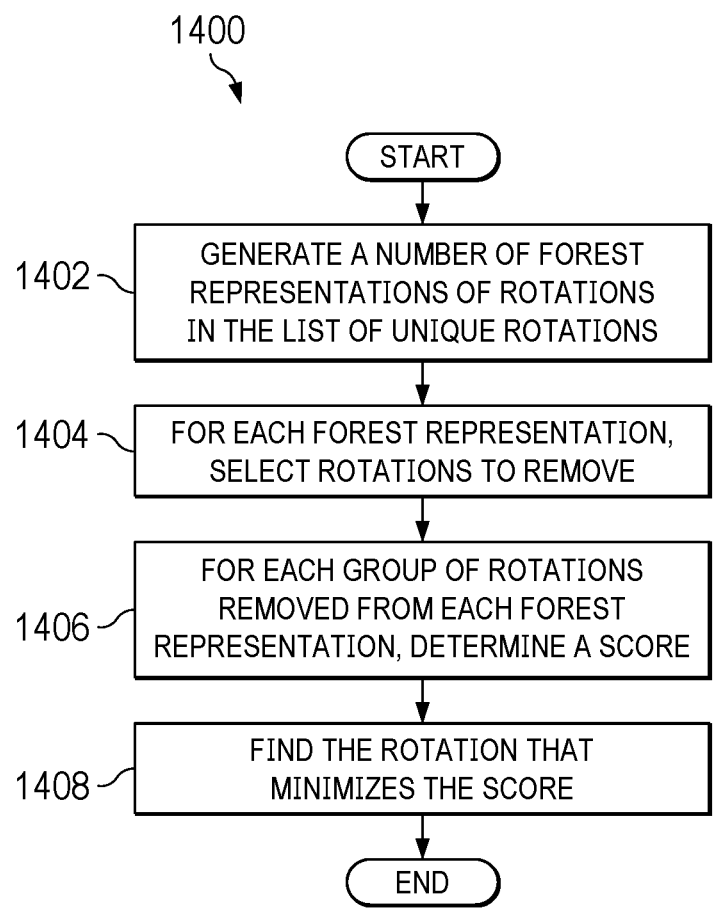
FIG. 14 depicts a flowchart illustrating a process for selecting a rotation value for a preliminary rotation to be applied to a list of unique rotations of a rotation vector in accordance with an illustrative embodiment.

FIG. 14 depicts a flowchart illustrating a process for selecting a rotation value for a preliminary rotation to be applied to a list of unique rotations of a rotation vector in accordance with an illustrative embodiment. Process 1400 is a detailed example of step 1202 in FIG. 12.

Process 1400 begins by generating a number of forest representations of rotations in the list of unique rotations (step 1402). A plurality of methods may be used to generate different forest representations. The best among them can be selected according to the needs of a given application.

For each forest representation, process 1400 then selects a number of rotations to remove (step 1404). The rotations might be removed one at a time. Alternatively, all of the selected rotations may be removed at once.

For each group of rotations removed from each forest representation, process 1400 determines a score (step 1406). The score may be based on at least one of number of rotations, forest depth, level of parallelization, etc. memory utilization, power consumption, or minimizing the required number of rotation keys used in a forest to meet requirements of particular hardware devices (i.e., fit inside a cache or memory). By minimizing the number of rotation keys a user can avoid generating them to begin with, thereby saving bandwidth.

Process 1400 finds the rotation for each forest representation that minimizes the score (step 1408). Process 1400 then ends.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for reducing homomorphic encryption (HE) rotations, the method comprising:
   receiving input of a source tensor of HE ciphertexts and a mapping of source elements from the source tensor to a target tensor of HE ciphertexts;
   for each source HE ciphertext, computing a rotation vector of required rotations to transform on the source tensor to the target tensor according to the mapping;
   computing a list of unique rotations within each rotation vector;
   for each rotation vector, generating a first list and second list of rotations from the list of unique rotations, wherein the rotations in the first list are applied before the rotations in the second list, and wherein the combined number of rotations in the first and second list is less than the list of unique rotations of the rotation vector;
   for each rotation in the first list:
      multiplying the source HE ciphertext by a first mask that selects a subset of source elements according to the mapping to generate a first masked vector;

computing a source ciphertext vector that holds the selected source elements of the first masked vector cyclically rotated by a number of slots specified by the rotation in the first list;

for each rotation in the second list:
multiplying the source HE ciphertext by a second mask that selects a subset of source elements according to the mapping to generate a second masked vector;
summing the second masked vector and any source ciphertext vector generated according to the first list requiring the same rotation in the second list;
computing a rotated HE ciphertext that holds the selected source elements of the second masked vector and source ciphertext vector rotated by a number of slots specified by the unique rotation in the second list;

summing the rotated HE ciphertexts generated according to the first and second lists; and outputting the target tensor of HE ciphertexts.

2. The method of claim 1, further comprising recursively applying the steps of claim 1, wherein the second list of rotations is substituted for the list of unique rotations.

3. The method of claim 2, wherein the recursion ends upon one of:
reaching a specified maximum multiplication depth;
a latency value of adding another iteration decreases below zero; or
when the list of unique rotations can no longer be split into two lists.

4. The method of claim 1, wherein:
the first mask is:
approximately 1 in slot positions corresponding to source elements to be selected from the HE ciphertext for the rotation in the first list;
approximately 0 for all other source elements in the HE ciphertext; and
the second mask is:
approximately 1 in slots positions corresponding to source elements to be selected from the HE ciphertext for the rotation in the second list; and
approximately 0 for all other source elements in the HE ciphertext.

5. The method of claim 1, wherein generating a first list and second list of rotations from the list of unique rotations further comprises:
selecting a number of rotation index values to apply to a ciphertext that modify the list of unique rotations for that ciphertext;
applying the rotation index values to a number of unique rotations that can be merged with target rotations in the list of unique rotations;
generating a dictionary of key values for the unique rotations in the rotation vector;
assigning respective first key values to the unique rotations to which the rotation index values are applied;
assigning a second key value to the target rotations, wherein the second key value indicates the target rotations are left unaltered; and
assigning a third key value to unique rotations in the rotation vector, wherein the third key value indicates that application of the rotation index value produces no net reduction in the number of rotations.

6. The method of claim 5, wherein the rotation index values comprise the first list of rotations and the rotations assigned the second key value and third key value comprise the second list of rotations.

7. The method of claim 5, wherein selecting the rotation index value comprises:
generating a number of forest representations of rotations in the list of unique rotations;
for each forest representation, selecting a number of rotations to remove;
for each group of rotations removed from each forest representation, determining a score; and
finding the rotation for each forest representation that minimizes the score.

8. The method of claim 7, wherein the number of rotations selected for removal are removed one at the time.

9. The method of claim 7, wherein the number of rotations selected for removal are removed all at once.

10. The method of claim 7, wherein the score is determined by at least one of:
number of rotations;
forest depth;
level of parallelization;
memory utilization;
power consumption; or
minimizing the required number of rotation keys.

11. A system for reducing homomorphic encryption (HE) rotations, the system comprising:
a storage device that stores program instructions;
one or more processors operably connected to the storage device and configured to execute the program instructions to cause the system to:
receive input of a source tensor of HE ciphertexts and a mapping of source elements from the source tensor to a target tensor of HE ciphertexts;
for each source HE ciphertext, compute a rotation vector of required rotations to transform on the source tensor to the target tensor according to the mapping;
compute a list of unique rotations within each rotation vector;
for each rotation vector, generate a first list and second list of rotations from the list of unique rotations, wherein the rotations in the first list are applied before the rotations in the second list, and wherein the combined number of rotations in the first and second list is less than the list of unique rotations of the rotation vector;
for each rotation in the first list:
multiply the source HE ciphertext by a first mask that selects a subset of source elements according to the mapping to generate a first masked vector;
compute a source ciphertext vector that holds the selected source elements of the first masked vector cyclically rotated by a number of slots specified by the rotation in the first list;
for each rotation in the second list:
multiply the source HE ciphertext by a second mask that selects a subset of source elements according to the mapping to generate a second masked vector;
sum the second masked vector and any source ciphertext vector generated according to the first list requiring the same rotation in the second list;
compute a rotated HE ciphertext that holds the selected source elements of the second masked vector and source ciphertext vector rotated by a number of slots specified by the unique rotation in the second list;
sum the rotated HE ciphertexts generated according to the first and second lists; and
output the target tensor of HE ciphertexts.

12. The system of claim 11, wherein the program instructions further cause the system to recursively apply the steps of claim 11, wherein the second list of rotations is substituted for the list of unique rotations.

13. The system of claim 12, wherein the recursion ends upon one of:
reaching a specified maximum multiplication depth;
a latency value of adding another iteration decreases below zero; or
when the list of unique rotations can no longer be split into two lists.

14. The system of claim 11, wherein generating a first list and second list of rotations from the list of unique rotations further comprises:
selecting a number of rotation index values to apply to a ciphertext that modify the list of unique rotations for that ciphertext;
applying the rotation index values to a number of unique rotations that can be merged with target rotations in the list of unique rotations;
generating a dictionary of key values for the unique rotations in the rotation vector;
assigning respective first key values to the unique rotations to which the rotation index values are applied;
assigning a second key value to the target rotations, wherein the second key value indicates the target rotations are left unaltered; and
assigning a third key value to unique rotations in the rotation vector, wherein the third key value indicates that application of the rotation index value produces no net reduction in the number of rotations.

15. The system of claim 14, wherein the rotation index values comprise the first list of rotations and the rotations assigned the second key value and third key value comprise the second list of rotations.

16. The system of claim 14, wherein selecting the rotation index value comprises:
generating a number of forest representations of rotations in the list of unique rotations;
for each forest representation, selecting a number of rotations to remove;
for each group of rotations removed from each forest representation, determining a score; and
finding the rotation for each forest representation that minimizes the score.

17. The system of claim 16, wherein the number of rotations selected for removal are removed one at the time.

18. The system of claim 16, wherein the number of rotations selected for removal are removed all at once.

19. The system of claim 16, wherein the score is determined by at least one of:
number of rotations;
forest depth;
level of parallelization;
memory utilization;
power consumption; or
minimizing the required number of rotation keys.

20. A computer program product for reducing homomorphic encryption (HE) rotations, the computer program product comprising:
a persistent storage medium having program instructions configured to cause one or more processors to:
receive input of a source tensor of HE ciphertexts and a mapping of source elements from the source tensor to a target tensor of HE ciphertexts;
for each source HE ciphertext, compute a rotation vector of required rotations to transform on the source tensor to the target tensor according to the mapping;
compute a list of unique rotations within each rotation vector;
for each rotation vector, generate a first list and second list of rotations from the list of unique rotations, wherein the rotations in the first list are applied before the rotations in the second list, and wherein the combined number of rotations in the first and second list is less than the list of unique rotations of the rotation vector;
for each rotation in the first list:
multiply the source HE ciphertext by a first mask that selects a subset of source elements according to the mapping to generate a first masked vector;
compute a source ciphertext vector that holds the selected source elements of the first masked vector cyclically rotated by a number of slots specified by the rotation in the first list;
for each rotation in the second list:
multiply the source HE ciphertext by a second mask that selects a subset of source elements according to the mapping to generate a second masked vector;
sum the second masked vector and any source ciphertext vector generated according to the first list requiring the same rotation in the second list;
compute a rotated HE ciphertext that holds the selected source elements of the second masked vector and source ciphertext vector rotated by a number of slots specified by the unique rotation in the second list;
sum the rotated HE ciphertexts generated according to the first and second lists; and
output the target tensor of HE ciphertexts.

* * * * *